United States Patent [19]

Ranganathan et al.

[11] Patent Number: 5,535,292
[45] Date of Patent: Jul. 9, 1996

[54] VLSI ARCHITECTURES FOR POLYGON RECOGNITION

[75] Inventors: Nagarajan Ranganathan; Raghu Sastry, both of Tampa, Fla.

[73] Assignee: University of South Florida, Tampa, Fla.

[21] Appl. No.: 174,302

[22] Filed: Dec. 30, 1993

[51] Int. Cl.$^6$ .................... G06K 9/54; G06K 9/60
[52] U.S. Cl. .................... 382/302; 382/304; 382/199; 382/203
[58] Field of Search .................... 382/49, 1, 10, 382/14, 22, 24, 25, 302, 303, 304, 100, 153, 181, 155, 159, 199, 202, 203, 204; 364/488, 489, 490; 395/11

[56] References Cited

U.S. PATENT DOCUMENTS

| | | | |
|---|---|---|---|
| 4,809,346 | 2/1989 | Shu | 382/49 |
| 4,908,751 | 3/1990 | Smith | 382/49 |
| 5,305,399 | 4/1994 | Allen et al. | 382/49 |

OTHER PUBLICATIONS

Bunke et al., "VLSI Architectures for Polygon Recognition", IEEE Trans. VLSI Systems, vol. 1, No. 4, Dec. 1993, pp. 398–407.
Glanser et al., "Viewpoint Independent Representation and Recognition of Polygonal Faces in 3–D," IEEE Trans. Robotics Automat., vol. 9, No. 4, Aug. 1993, pp. 457–463.

*Primary Examiner*—Leo Boudreau
*Assistant Examiner*—Phuoc Tran
*Attorney, Agent, or Firm*—Calfee, Halter & Griswold

[57] ABSTRACT

A VLSI structure and method for polygon recognition that identifies an unknown two dimensional contour as corresponding to one or more of a plurality of known two dimensional contours. The VLSI architecture comprises a systolic processing system comprising a plurality of matrix element processing elements (MEPEs), and an array of feasible match processing elements (FMPEs) interconnected with selected MEPEs and with each other in a predetermined configuration. The plurality of MEPEs receive inputs comprising pairs of edge length ratios and corresponding threshold values for consecutive edges of the unknown contour and for each of the known polygon contours. Each MEPE (i) receives edge length ratios and threshold values for a pair of edges of the unknown contour and a known polygon contour, (ii) determines a dissimilarity value for the pair of edges, and (iii) directs this value to a selected FMPE of the array. The dissimilarity value is determined using the absolute differences between respective edge length ratios and threshold values for the pair of edges. The array of FMPEs determines feasible matches between pairs of consecutive edges of the unknown contour and the known polygon contours and delivers outputs related thereto, and a comparator device compares such outputs and delivers a final output which is indicative of the longest number of consecutive edges, above a predetermined minimum, for which feasible matches have occurred between the unknown contour and a known polygon contour.

18 Claims, 19 Drawing Sheets

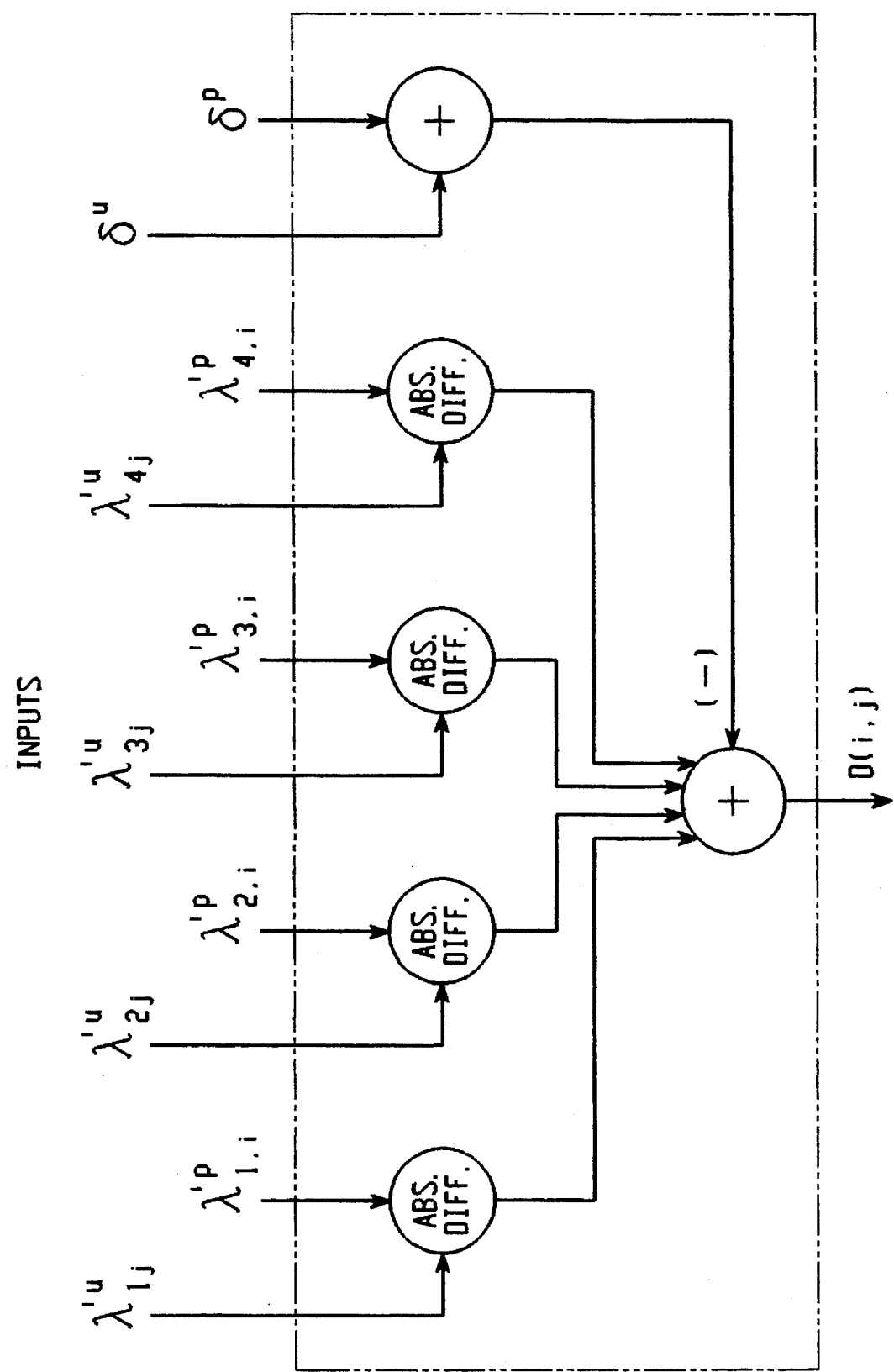

VLSI ARCHITECTURES FOR POLYGON RECOGNITION

FIELD OF THE INVENTION

The present invention relates to computer recognition of a two dimensional polygonal objects under any affine transformation and under the presence of occlusions, and particularly to implementation of such computer recognition techniques in VLSI ("Very Large Scale Integration") computer architecture.

BACKGROUND OF THE INVENTION

In a computer controlled system, it is often important for the system to recognize one or more three dimensional objects (e.g., three dimensional polygons) from a two dimensional graphical representation of a scene. For example, in a computer controlled robotic system, a camera may capture and generate, in digital form, a two dimensional graphical representation of a scene including one or more three dimensional objects. The system must be able to recognize the three dimensional objects from the two dimensional graphical representation of the scene, so that the computer can control a robot to properly operate on, or in connection with, the three dimensional objects. Recognition of a three dimensional object becomes particularly complicated when only a part of the object is within the field of the camera, or when the object is partially occluded by other objects in the field of the camera. In such cases, the computer must recognize the object from partial contours found in the two dimensional, graphical representation of the scene which is in the field of the camera.

In the past, different techniques have been proposed to enable computer systems to recognize a three dimensional object from a two dimensional graphical representation of a scene. One technique, proposed by Bunke and Glauser, is designed to recognize polygons, and is based upon local shape descriptors (referred to as edge length ratios), which are invariant under affine transformations, i.e., translation, scaling, rotation and ortho-graphic projection from three dimensions to a two dimensional plane. The technique involves computation of dissimilarity measures between the edge length ratios for all of the edges of an unknown polygon contour, comparison of the dissimilarity measures with the edge length ratios associated with the edges of a set of known prototypes (which are known polygon contours), and identifying different portions of the unknown contour as one of the prototypes when the dissimilarity measure between the edge length ratios for three consecutive edges is below a threshold value.

In the foregoing technique, as proposed by Bunke and Glauser, the dissimilarity measure between two edge length ratios $\lambda^P_{i,j}$, $\lambda^u_{i,k}$ for a prototype and unknown object, respectively, used the following formula:

$$d_i(\lambda^u_{i,k}, \lambda^P_{i,j}) = |\lambda^u_{i,k}/\lambda^P_{i,j} - 1|; j=1, \ldots, n_p; k=1, \ldots, n_u; i=1, \ldots, 4$$

Applicants believe the computation of dissimilarity measures by means of the Bunke and Glauser technique, does not lend itself readily to implementation in VLSI architectures. Specifically, applicants believe the circuitry required to handle the multiplication and division required for the Bunke and Glauser technique would be relatively slow and requires a large number of transistors (which would require a significant space) to implement the circuitry in VLSI architectures.

SUMMARY OF THE PRESENT INVENTION

The present invention relates to new and useful VLSI techniques for recognition of three dimensional objects from two dimensional representations of the objects. Moreover, the present invention provides VLSI architectures which are different from what would be required to implement the Bunke and Glauser technique, but which still make use of local shape descriptors which are invariant under affine transformations, i.e. translation, scaling, rotation and orthographic projection from 3-D to any 2-D plane. The technique is designed to recognize objects, especially polygons, even from a two dimensional representation of a scene which includes partial occlusions of the polygons. The architectures are systolic and fully utilize the principles of pipelining and parallelism in order to obtain high speed and throughput.

According to the technique of the invention, a plurality of known two dimensional polygonal contours are provided. The two dimensional known polygon contours comprise a plurality of edge length ratios (and corresponding threshold values) for each polygon contour. A scene containing an unknown object is viewed from any arbitrary orientation (e.g., at a predetermined camera angle), and a two dimensional image of the scene (including the unknown polygon contour) is produced. Edge length ratios (and corresponding threshold values) for the edges of the unknown polygon contour are calculated. A matrix is created based upon dissimilarity measures determined as a function of the absolute difference between the edge length ratios (and their corresponding threshold values) of consecutive edges of the stored two dimensional polygon contours and the edge length ratios (and their corresponding threshold values) for consecutive edges of the unknown polygon contour. A feasible match of the unknown polygon contour is determined by identifying a stored two dimensional polygon contour for which the dissimilarity measures, for at least three consecutive edges, is below a threshold level.

The recognition technique of the invention can also cope with partial occlusions. In this application, the term "partial polygon" is used to refer to partially occluded polygons. The technique recognizes partially occluded two dimensional contours by determining the longest feasible match, and identifying the known polygon contour which corresponds to that longest feasible match. Of course, the techniques that work for partial polygons also work for polygons that are not occluded, i.e., those that are completely visible.

This matching technique is efficient, and the operations performed by it simple and regular. Moreover, the technique is compute-bound and requires comparatively little input/output. These factors make the technique ideally suited for systolic VLSI implementation. Due to the extent of miniaturization possible in VLSI technology today, the size of designs that can be embedded in hardware has increased phenomenally. Miniaturization has also lead to faster circuitry. It is now feasible to develop extremely fast custom hardware for such computationally intensive problems. Speedup is achieved through the use of a high degree of parallelism and pipelining.

Further, according to the present invention, three versions of VLSI architectures are disclosed for implementing the applicants' polygon recognition technique. The architectures are designed to compute a matrix of dissimilarity measures and feasible matches for the unknown contour. The architectures are systolic in nature and yield maximum speed and throughput.

In each of the VLSI architectures according to the present invention, the matrix has a number of columns and rows of processing elements, some of which are matrix element processing elements (MEPEs) and others of which are feasible match processing elements (FMPEs). The number of rows changes as the unknown input is compared with each known polygon contour, one after another. The number of columns will change with different unknown inputs. The architectures are not affected by this constantly changing dimension of the matrix. All of the architectures are two-dimensional, where the processors in the first row are matrix element processing elements (MEPEs) which perform the dissimilarity computations, and the processors in all other rows are feasibility match processing elements (FMPEs) which perform feasible match computations.

Only the longest feasible match for a known polygon contour is output by these architectures to a host. The outputs of the last row of FMPEs is provided to a Comparator Network, which then performs a postprocessing step to determine the longest feasible match.

In one version of VLSI architecture according to the invention, the edge length ratios and corresponding threshold values of the unknown are prestored within the first row of MEPEs. All four edge length ratios for a particular edge of a known polygon contour are input to the architecture in parallel, while the edge length ratios for successive edges are serially input to the matrix of processing elements. The MEPEs in the first row of this architecture compute the elements of the matrix in a columnwise fashion. An architecture with 2N–1 Matrix Element Computation PEs (MEPEs) in the first row and an N×N array of Feasible Match Computation PEs (FMPEs) can process unknown inputs with up to N edges, and prototypes with arbitrary number of edges.

In another version of VLSI architecture according to the invention, the edge length ratios for both the unknown contour and (the known polygon contours) are fed into the first row of MEPEs from opposite ends. All four edge length ratios for a particular edge are input in parallel for the prototype and the unknown input. Moreover, new values are input to the architecture only once in every two clock cycles. Each MEPE in the first row computes dissimilarity measures along diagonals. An implementation of this architecture with 2L+1 MEPEs and an array of 2L×(2L+1) FMPEs can process prototypes and unknown inputs with up to 2L edges.

In yet another version of VLSI architecture according to the invention, the MEPEs in the first row compute elements of the dissimilarity measures along diagonals. However, this variation requires that only two values be input per clock cycle. Instead of requiring that all four edge length ratios for an edge be input in parallel, the edge length ratios are input one after another. This results in simpler hardware (fewer absolute difference modules, and fewer FMPE's) compared to the other two. An implementation with (4L+1) MEPE's in the first row and (L+1)×2L FMPE's can support prototypes and unknown inputs with up to 2L edges.

All the three proposed architectures operate at 100% efficiency, meaning that the entire hardware is utilized throughout the computation. When the problem size is smaller than the array size, some of the PEs will be idle. The architectures are now discussed in greater detail. It is assumed in all the architectural descriptions that the result of the computation performed by a Processing Element at time t is available at the output during the next cycle at time t+1.

Further features of the present invention will become further apparent from the following detailed description and the accompanying drawings.

BRIEF DESCRIPTION OF THE DRAWINGS

FIG. 15 is a schematic illustration of a matrix element computation processing element for the VLSI architecture of FIGS. 13A, 13B, and 13C.

DETAILED DESCRIPTION OF THE PREFERRED EMBODIMENT

The following detailed description begins with a review of the concept of polygon shape descriptors and a brief overview of the partial polygon recognition algorithm proposed by Bunke and Glauser.

I. The Concept of Edge Length Ratios As Polygon Shape Descriptors

Figure 1:
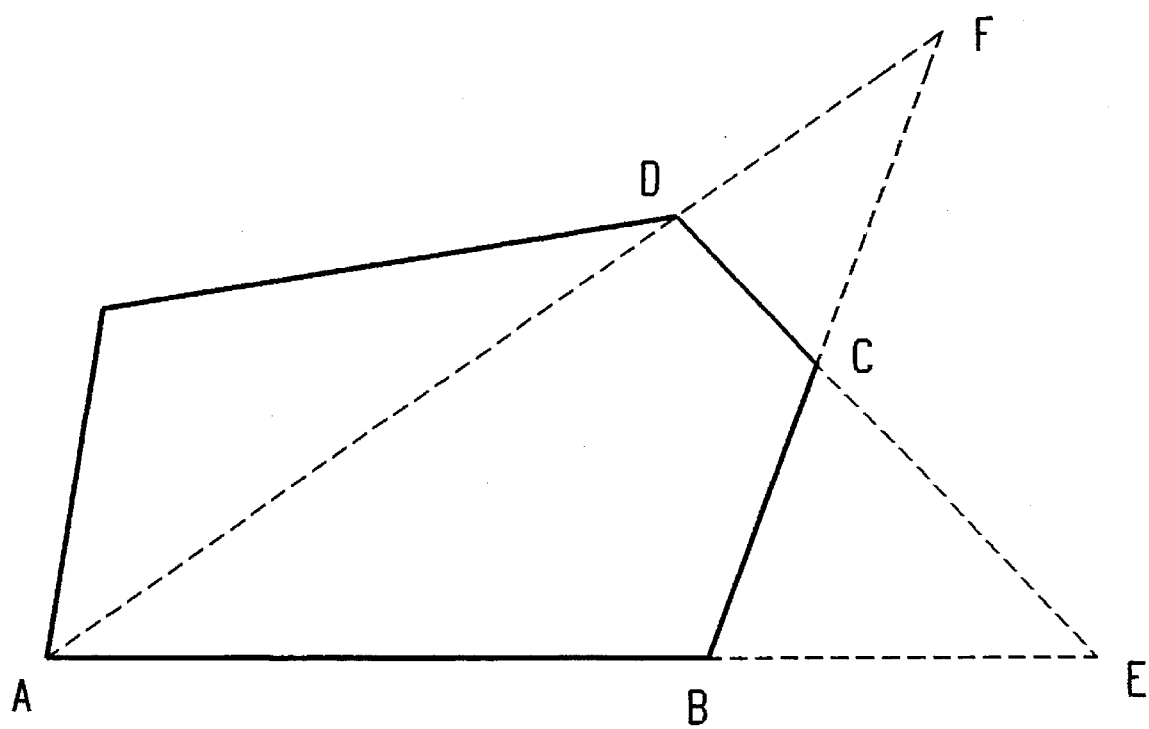
FIG. 1 is an illustration of a planar polygon, which is useful in explaining the concept of edge length ratio.

Referring to FIG. 1, it is assumed that polygons are specified by their vertices in the anticlockwise order. The shape descriptors described by Glauser and Bunke are applicable to polygons with four or more vertices. The vertices are sometimes considered modulo n to account for the cyclic nature of polygons (i.e. $A_{[i]}$, where $[i]=i \bmod n$).

Consider the four consecutive vertices A, B, C and D of the polygon shown in FIG. 1. If the segments AB and CD are not parallel, then their point of intersection E can be expressed as:

$$E=B+\lambda_1(B-A)$$

$$E = C + \lambda_2(C-D)$$

$\lambda_1$ is called the left edge length ratio of edge AB and $\lambda_2$ the right edge length ratio of CD. Obviously $\lambda_1$ and $\lambda_2$ are always non-zero. However if AB and CD are parallel then $\lambda_1 = \lambda_2 = \infty$. To deal with such situations, an additional pair of edge length ratios is defined. Referring again to FIG. 1, if the lines passing through A and D, and B and C, are not parallel then their point of intersection F can be expressed as:

$$F = C + \lambda_3(C-B)$$

$$F = A + \lambda_4(D-A)$$

$\lambda_3$ and $\lambda_4$ are called the first and second generalized edge length ratios of edge BC. As in the previous case both these ratios are always non-zero.

It has been demonstrated in by Bunke and Glauser that these descriptors are invariant under affine transformations (translation, rotation, scaling and orthographic projection from 3-D to any 2-D plane). Moreover, they have also been shown to be complete, in that given at least three consecutive vertices they allow the reconstruction of the polygon in 3-D space.

II. The Recognition Procedure (Generally)

Given a set of prototypes $P = \{p_1, \ldots, p_L\}$ where each prototype is represented by its edge length ratios ($p = \{(\lambda^p_{i,1}, \lambda^p_{i,2}, \ldots \lambda^p_{np}) | i=1, \ldots, 4\}$), and an occluded object u with $n_u$ vertices and corresponding edge length ratios, the recognition problem is to determine if u is the same as one of the prototypes, and if so, which one. The assumption is that the vertices are extracted properly, i.e. no missing or extraneous vertices are present. A dissimilarity measure is defined, and we decide u is one of the prototypes if the dissimilarity between the two is the least among all the prototypes and is also below a threshold value. The dissimilarity between two edge length ratios $\lambda^p_{i,j}$ and $\lambda^u_{i,k}$ is defined as:

$$d_i(\lambda^u_{i,k}, \lambda_{pi,j}) = |\lambda^u_{i,k}/\lambda_{pi,j} - 1|; j=1, \ldots, n_p; k=1, \ldots, n_u; i=1, \ldots, 4$$

A smaller value of $d_i(\lambda^u_{i,k}/\lambda^p_{i,j})$ indicates a smaller dissimilarity between $\lambda^u_{i,k}$ and $\lambda^p_{i,j}$. Summing over all four different edge length ratios the following combined dissimilarity measure is obtained:

$$d(\lambda^u_k, \lambda^p_j) = \sum_{i=1}^{4} \alpha_i d_i(\lambda^u_{i,k}, \lambda^p_{i,j})$$

where $0 \leq \alpha_i \leq 1$, and $\sum_{i=1}^{4} \alpha_i = 1$

The $\alpha_i$'s represent the relative importance of the i-th type of edge length ratios in the recognition problem.

Since the unknown object may be partially occluded, only parts of the boundary need to be regarded for measuring the dissimilarity. The dissimilarity measure, starting at vertex [j+1] of the unknown contour and vertex [i+1] of the known polygon contour p, and summing up (the combined dissimilarity measure described earlier) over l consecutive edges, is defined as:

$$d(u(j), p(i), l) = \sum_{v=1}^{l} d(\lambda^u_{[j+v]}, \lambda^p_{[i+v]})$$

$i = 1, \ldots, n_p; \quad j = 1, \ldots, n_u; \quad l = 1, \ldots, \min(n_u, n_p)$ Described below is a simple method for computing $d(u(j), p(i), l)$ in quadratic time and space. A two-dimensional matrix MATCH(i,j) is defined as follows:

$$MATCH(i,j) = \begin{cases} \sum_{v=1}^{i} d(\lambda^u_{[j-i+v]}, \lambda^p_{[v]}), & \text{if } j \geq i; \\ \sum_{v=1}^{j} d(\lambda^u_{[v]}, \lambda^p_{[i-j+v]}), & \text{otherwise.} \end{cases}$$

$i = 1, \ldots, n_p + \min(n_u, n_p); j = 1, \ldots, n_u + \min(n_u, n_p)$.

Clearly $MATCH(1,j) = d(\lambda^u_{[j]}, \lambda^p_{[1]})$ and $MATCH(i,1) = d(\lambda^u_{[1]}, \lambda^p_{[i]})$.

Further, it can be shown that:

$$MATCH(i,j) = MATCH(i-1, j-1) + d(\lambda^u_{[j]}, \lambda^p_{[i]})$$

The above equation presents a simple way to compute the matrix MATCH(i,j). Assuming that the unknown input is specified along the columns, and the prototypes along the rows of the matrix, the first row and column are calculated as described earlier. The other elements can then be obtained using the last formula. It can also be easily demonstrated that:

$$d(u(j), p(i), l) = MATCH(i+l, j+l) - MATCH(i,j)$$

Thus, the procedure described above can be used to effectively compute the dissimilarity measure for partial contours. $d(u(j), p(i), l)$ can then be used to recognize objects that are only partially visible. A threshold $\theta$ is used to decide whether or not a partial predetermined feasible match criteria has occurred, and is obtained from $\theta = l \times \delta$ where l is the length of the partial contour actually matched and $\theta$ is the average admissible dissimilarity.

After MATCH (i,j) is computed, the technique searches for feasible matches ((i j)l). A feasible match refers to the partial contour of the unknown input and prototype, consisting of l consecutive edges starting at positions j and i respectively, with $d(u(j), p(i), l) < \theta$.

III. Recognition Technique According To The Present Invention

Glauser and Bunke use the following definition for the dissimilarity measure:

$$d_i(\lambda^u_{i,k}, \lambda^p_{i,j}) = |\lambda^u_{i,k}/\lambda^p_{i,j} - 1|; j=1, \ldots, n_p; k=1, \ldots, n_u; i=1, \ldots, 4$$

Performing this calculation in hardware requires floating point (fixed point) divider circuits, which are slow and require a large number of transistors. According to the present invention, an alternative definition for the dissimilarity measure is provided. Specifically, an alternative dissimilarity measure for the recognition procedure, called the "absolute difference" dissimilarity measure is defined as:

$$d_i^*(\lambda^u_{i,k}, \lambda^p_{i,j}) = |\lambda^u_{i,k} - \lambda^p_{i,j}|$$

By using this dissimilarity measure, the recognition technique can be simplified considerably to aid the hardware implementation, while yielding performance that is close to that provided by the technique according to Bunke and Glauser. Bunke and Glauser used the parameter value $\theta = 0.18$ in all their experiments (in other words, they allow a distortion of 18% in the edge length ratios). The applicants have experimented with using different threshold values for the predetermined feasible match criteria θ in different ranges of threshold values for the edge length ratios. The applicants found that the absolute difference dissimilarity measure along with threshold values of 0.0625, 0.175, 0.5 and 2.5 for the predetermined feasible match criteria θ, in the ranges [0,0.5),[0.5,1.25),[1.25,3), and [3,∞) respectively, for the edge length ratios, gave results very similar to those according to Bunke and Glauser's technique. These threshold values for the feasible match criteria θ are referred to herein as $\theta_1$, $\theta_2$, $\theta_3$ and $\theta_4$ respectively. The values 0.5, 1.5 and 5 represent three thresholds ($\tau_1$, $\tau_2$, and $\tau_3$) which will be used to determine which value of θ to use.

The combined dissimilarity measure is modified as follows:

$$d^*(\lambda_k^u, \lambda_j^p) = \sum_{i=1}^{4} \alpha_i(d_i^*(\lambda_{i,k}^u, \lambda_{i,j}^p) - (\delta_k/2 + \delta_j/2))$$

$$\delta_k = \begin{cases} \delta_1/2, & \text{if } 0 \leq \lambda_{i,k}^u < \tau_1; \\ \delta_2/2, & \text{if } \tau_1 \leq \lambda_{i,k}^u < \tau_2; \\ \delta_3/2, & \text{if } \tau_2 \leq \lambda_{i,k}^u < \tau_3; \\ \delta_4/2, & \text{otherwise.} \end{cases} \quad \delta_j = \begin{cases} \delta_1/2, & \text{if } 0 \leq \lambda_{i,j}^p < \tau_1; \\ \delta_2/2, & \text{if } \tau_1 \leq \lambda_{i,j}^p < \tau_2; \\ \delta_3/2, & \text{if } \tau_2 \leq \lambda_{i,j}^p < \tau_3; \\ \delta_4/2, & \text{otherwise.} \end{cases}$$

where $0 \leq \alpha_i \leq 1$, and $\sum_{i=1}^{4} \alpha_i = 1$

The foregoing can be modified as follows to make the hardware implementation simpler. According to the new definitions:

$$d^*(\lambda_{[j]}^u, \lambda_{[i]}^p) \equiv d(\lambda_{[j]}^u, \lambda_{[i]}^p) - \delta$$

Define $$D(i,j) = d^*(\lambda_{[j]}^u, \lambda_{[i]}^p) - \delta$$

$$i=2, \ldots, n_p + \min(n_p, n_u); j=2, \ldots, n_u + \min(n_p, n_u)$$

By definition:

$$d(u(j), p(i), l) = \sum_{v=1}^{l} d(\lambda_{[j+v]}^u, \lambda_{[i+v]}^p)$$

A partial contour of length l starting at position (i,j) is determined to be a feasible match (i,j),l), if and only if:

$$d(u(j),p(i),l) \; l \times \theta.$$

This is the same as the condition:

$$\sum_{v=1}^{l} (d(\lambda_{[j+v]}^u, \lambda_{[i+v]}^p) - \delta) < 0$$

or equivalently, $$\sum_{v=1}^{l} D(i+v, j+v) < 0$$

$$i = 1, \ldots, n_p; \quad j = 1, \ldots, n_u; \quad l = 1, \ldots, \min(n_p, n_u)$$

Thus, it is not necessary to explicitly compute elements of the matrix MATCH(i,j). Instead, elements of matrix D(i,j) are computed and these values are then used in determining feasible matches.

IV. Feasible Matches Computation According To The Present Invention

After the computation of the matrix D(i,j) for a known polygon contour p, a technique according to the present invention looks for feasible matches ((i,j),l). A number of feasible matches may exist for a particular known polygon contour. Postprocessing is required to resolve conflicts, and to select those feasible matches that are to be accepted. A simple conflict resolution strategy was found to give reliable results. If there are more than one feasible matches for a particular known prototype contour, only the longest one is selected. Therefore, at most one feasible match per known prototype contour (corresponding to the longest matching partial contour) is reported by the technique of the invention. The procedure described below reports this feasible match.

```
Procedure find_feasible_match
input       :   the matrix D(i,j)
output      :   the longest feasible match of the form ((i,j),l)
len:=0;
for i = 1 to n_p
    for j = 1 to n_u  {
        l:=1;
        sum := D(i,j);
        while (sum ≤ 0 and l ≤ min(n_u,n_p))  {
            sum :=sum + D(i+1,j+1);
            l:=l + 1;
        }
        if (l ≥ len) {
            len := l;
            pos_i := i;
            pos_j :=j;
        }
    }
output ((pos_i,pos_j),len);
end find_feasible_match
```

A certain amount of postprocessing still needs to be performed. Suppose ((i,j),l) is the longest feasible match for known polygon contour p. If there exists another known polygon contour p' with a feasible match ((i',j'),l') that properly includes ((i,j),l) i.e., j'≤j, j+l, l<l', feasible match ((i,j),l) is discarded, and only ((i',j'),l') is retained. This postprocessing step is not performed by the architectures proposed in this paper, and needs to be performed by the host.

V. Experimental Results

In order to evaluate the performance of the proposed technique, computer simulations of both the proposed technique and Bunke and Glauser's technique were performed on a set of 20 images.

Twelve different shapes were used as prototypes in the experiments. 512×512 images of the shapes were acquired and a series of image processing steps were performed in order to extract the polygonal vertices. These steps comprised thresholding, connected components detection, boundary pixels extraction and finally boundary approximation by straight line segments. The edge length ratios were then calculated for the known polygon contours. The same procedure was used in obtaining edge length ratios for scenes with unknown contours.

TABLE 1

Feasible Matches based on Bunke and Glauser's Technique

| Known polygon unknown | key (18) | plane (21) | star (10) | pent. (5) | plant (13) | cross (16) | apple (16) | arrow (8) | bird (11) | crystal (15) | letter-w (14) | letter-c (18) |
|---|---|---|---|---|---|---|---|---|---|---|---|---|
| Scene 1 (15) | | | | | | | | | | 0, 2, 15 | | |
| Scene 2 (30) | | | 0, 12, 6 | | | | 14, 24, 9 | | 9, 5, 5 | | | |
| Scene 3 (33) | | | | 0, 29, 2 | | 2, 1, 10 | | | | | 9, 14, 9 | |
| Scene 4 (32) | | | | | 2, 18, 10 | | | 5, 29, 4 | | | | 3, 6, 11 |
| Scene 5 (40) | 15, 0, 15 | 1, 20, 18 | | | | | | | | | | |
| Scene 6 (50) | | | | | 1, 19, 9 | | 3, 31, 14 | 0, 10, 6 | | | | 14, 47, 10 |
| Scene 7 (44) | 15, 43, 15 | | 0, 18, 4 | | 4, 34, 7 | | | | | 14, 24, 9 | | |
| Scene 8 (35) | | | 0, 25, 3 | 1, 19, 3 | | 8, 31, 8 | | | | | 13, 7, 8 | |
| key40 (12) | 17, 10, 10 | | | | | | | | | | | |
| plane40 (13) | | | | | | | | | | | | |
| star40 (8) | | | 3, 3, 4 | | | | | | | | | |
| pent40 (6) | | | | 2, 5, 2 | | | | | | | | |
| plant40 (14) | | | | | 6, 7, 6 | | | | | | | |
| cross40 (11) | | | | | | 4, 6, 8 | | | | | | |
| apple40 (11) | | | | | | | 1, 5, 9 | | | | | |
| arrow40 (8) | | | | | | | | 1, 7, 8 | | | | |
| bird40 (9) | | | | | | | | | 7, 4, 5 | | | |
| crystal40 (10) | | | | | | | | | | 13, 7, 7 | | |
| let-w40 (10) | | | | | | | | | | | 10, 5, 7 | |
| let-c40 (13) | | | | | | | | | | | | 3, 3, 10 |

Images of 8 scenes which contained randomly placed overlapping objects were also acquired. The degree of overlap was controlled such that at least 40% of the edge length ratios for each object in the scene could be obtained. The scenes contained between 2 and 4 overlapping polygons. Images were also acquired of each prototype where only 40% of the edge length ratios were detectable. The differences between the known polygon contours and unknown contours were due to translation, rotation, scaling, and viewing angle. Each of the 12 prototypes was matched with the scenes using both Bunke and Glauser's technique and the applicants' technique.

The results are presented in Tables 1 and 2. Only the longest feasible matches for each known polygon contour are reported, and postprocessing (as explained in the previous subsection) was performed on the results. All edge length ratios were given equal importance, i.e. $\alpha_j = 0.25$, $i=1, \ldots, 4$. Applicants used the parameter value $\delta = 0.18$ for Bunke and Glauser's technique and the values presented in the previous subsection as thresholds for the proposed technique. The numbers in brackets represent the number of edges in that image. The entries in the table are the $((i,j),l)$ feasible match triples. The bottom 12 rows of the tables contain results obtained from matching the prototypes to

TABLE 2

Feasible Matches based on Applicants' Technique

| Known polygon unknown | key (18) | plane (21) | star (10) | pent. (5) | plant (13) | cross (16) | apple (16) | arrow (8) | bird (11) | crystal (15) | letter-w (14) | letter-c (18) |
|---|---|---|---|---|---|---|---|---|---|---|---|---|
| Scene 1 (15) | | | | | | | | | | 0, 2, 15 | | |
| Scene 2 (30) | | | 1, 11, 7 | | | | 14, 24, 9 | | 9, 5, 5 | | | |
| Scene 3 (33) | | | | 0, 29, 2 | | 2, 1, 10 | | | | | 7, 12, 11 | |
| Scene 4 (32) | | | | | 2, 18, 9 | | | 5, 29, 4 | | | | 3, 6, 9 |
| Scene 5 (40) | 15, 0, 15 | 1, 20, 18 | | | | | | | | | | |
| Scene 6 (50) | | | | | 1, 19, 9 | | 3, 31, 14 | 0, 10, 6 | | | | 14, 47, 7 |
| Scene 7 (44) | 4, 6, 8 | | 1, 17, 5 | | 4, 34, 7 | | | | | 3, 28, 5 | | |
| Scene 8 (35) | | | 1, 24, 4 | 0, 19, 2 | | 8, 31, 8 | | | | | 0, 8, 6 | |
| key40 (12) | 1, 0, 8 | | | | | | | | | | | |
| plane40 (13) | | | | | | | | | | | | |
| star40 (8) | | | 3, 3, 4 | | | | | | | | | |
| pent40 (6) | | | | | | | | | | | | |
| plant40 (14) | | | | | 6, 7, 6 | | | | | | | |
| cross40 (11) | | | | | | 6, 8, 6 | | | | | | |
| apple40 (11) | | | | | | | 1, 5, 7 | | | | | |
| arrow40 (8) | | | | | | | | 0, 6, 8 | | | | |
| bird40 (9) | | | | | | | | | 7, 4, 5 | | | |
| crystal40 (10) | | | | | | | | | | 12, 6, 8 | | |
| let-w40 (10) | | | | | | | | | | | 10, 5, 7 | |
| let-c40 (13) | | | | | | | | | | | | 4, 4, 8 | images of them having only about 40% of the edge length ratios detectable. The results obtained by the proposed technique closely match those obtained by Bunke and Glauser's technique.

VI. VLSI Architectures According To The Present Invention (In General)

Three different VLSI architectures are proposed for implementing the applicants' polygon recognition technique. The architectures are designed to compute (i) D(i,j) and (ii) Feasible matches—((i,j),l). The architectures are systolic in nature and yield maximum speed and throughput.

The matrix D(i,j) has $n_u+\min(n_u,n_p)$ columns and $n_p+\min(n_u,n_p)$ rows as defined earlier. The number of rows changes as the unknown contour (and its corresponding threshold values) is compared with each known prototype contour (and its corresponding threshold values), one after another. Similarly, the number of columns will change with different unknown contours. The architectures according to the present invention are not affected by this constantly changing dimension of the matrix. All of the architectures according to the present invention are two-dimensional, where the processors in the first row (MEPEs) perform the dissimilarity computations, and the processors in all other rows (FMPEs) perform feasible match computations. The matrix elements computed by the MEPE move down the FMPE array along two channels:

1. a fast channel that allows each element to meet with elements on the same diagonal that precede it, and
2. a slow channel that permits the element to interact with succeeding diagonal elements.

Only the longest feasible match for a known polygon contour is output by these architectures to the host. The outputs of the last row of FMPEs is provided to a Comparator Network, which then performs the postprocessing step.

Some salient features of the proposed VLSI architectures are listed below.

(i) VLSI Architecture 1 (FIG. 2): In this architecture, the edge length ratios of the unknown contour (and corresponding threshold values) are prestored within the first row of MEPEs. All four edge length ratios for a particular edge of a known polygon contour are input to the system in parallel, while the edge length ratios for successive edges are serially input to the system. The Processing Elements in the first row of this architecture compute the elements of the matrix D(i,j) in a columnwise fashion. An architecture with 2N−1 Matrix Element Computation PEs (MEPEs) in the first row and an N×N array of Feasible Match Computation PEs (FMPEs) can process unknown contours with up to N edges, and known polygon contours with arbitrary number of edges.

(ii) VLSI Architecture 2 (FIGS. 9A and 9B): The edge length ratios for both the unknown contour and the known polygon contours are fed into the first row of Processing Elements of this architecture from opposite ends. All four edge length ratios for a particular edge are input in parallel for a known polygon contour and the unknown contour. Moreover, new values are input to the architecture only once in every two clock cycles. Each MEPE in the first row computes elements of D(i,j) along diagonals. An implementation of this architecture with 2L+1 MEPEs and an array of 2L×(2L+1) FMPEs can process known polygon contours and unknown contours with up to 2L edges.

(iii) VLSI Architecture 3 (FIGS. 13A, 13B, and 13C): This architecture is similar to the second one in that PE's in the first row compute elements of D(i,j) along diagonals.

However, this variation requires that only two values be input per clock cycle. Instead of requiring that all four edge length ratios for an edge be input in parallel, the edge length ratios $\lambda_{i,j}$, $1 \leq i \leq 4$ are input one after another. This results in simpler hardware (fewer absolute difference modules, and fewer FMPE's) compared to the other two. An implementation with (4L+1) MEPE's in the first row and (L+1)×2L FMPE's can support known polygon contours and unknown contours with up to 2L edges.

All the three proposed architectures operate at 100% efficiency, meaning that the entire hardware is utilized throughout the computation. When the problem size is smaller than the array size, some of the PEs will be idle. The architectures are discussed in greater detail below. It is assumed in all the architectural descriptions that the result of the computation performed by a Processing Element at time t is available at the output during the next cycle at time t+1. A d in the figures represents the introduction of an additional one cycle delay.

VII. VLSI Architecture 1 (FIG. 2)

Figure 2:
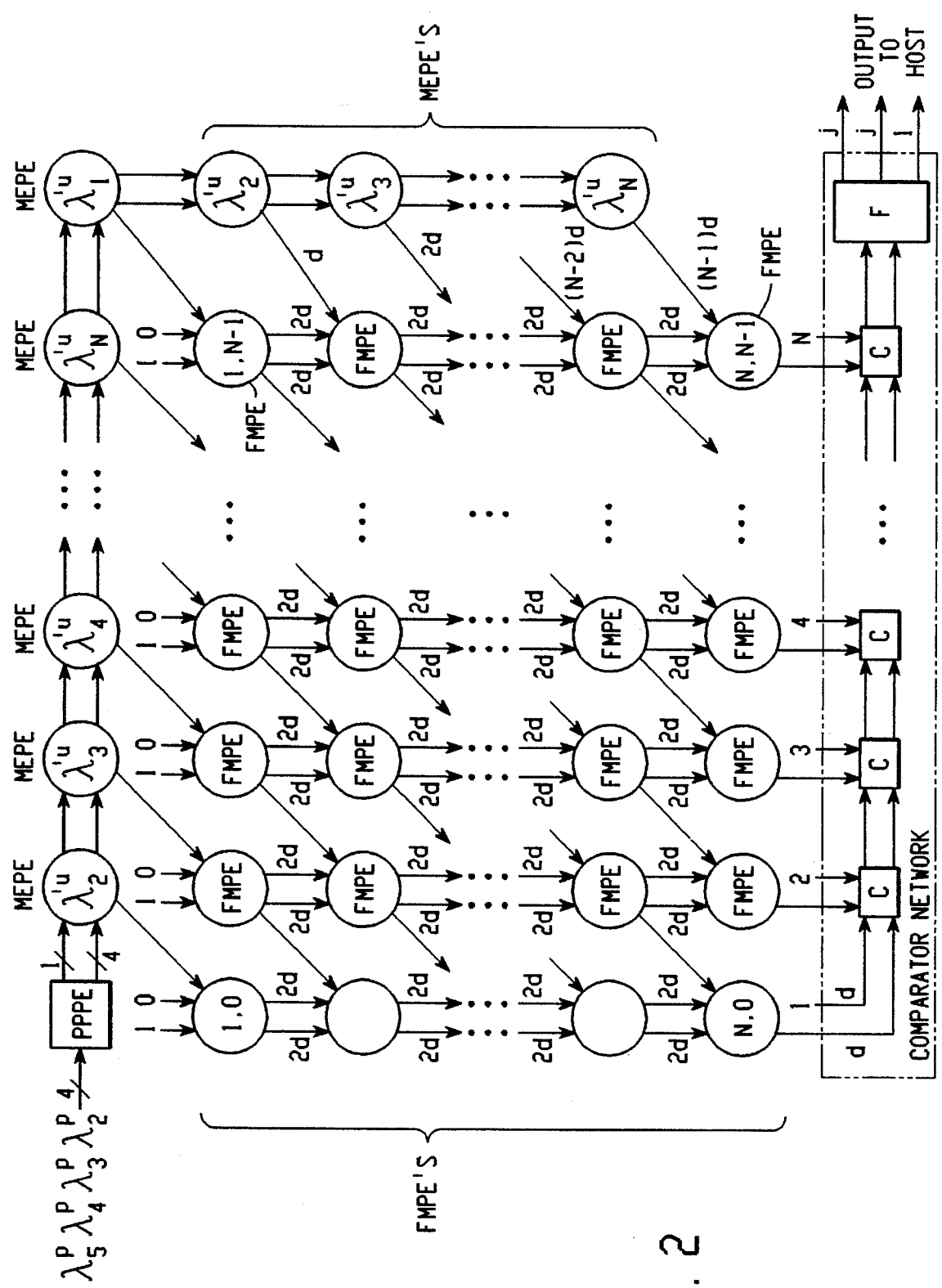
FIG. 2 is a schematic illustration of a VLSI architecture for implementing the technique of the present invention.

The block diagram for this architecture is shown in FIG. 2. The edge length ratios (and corresponding threshold values) of the unknown contour are prestored while those of the known polygon contours are fed into the MEPEs from one end, one after another. The edge length ratios are preprocessed as described below, before being input to the MEPEs. The PEs in the first row and last column (MEPEs), perform matrix element computations, and the N×N array of PEs (FMPEs) in the bottom N rows perform feasible match computations. The various components of the architecture and the hardware processing technique are described in detail below.

A. Preprocessing

Figure 3:
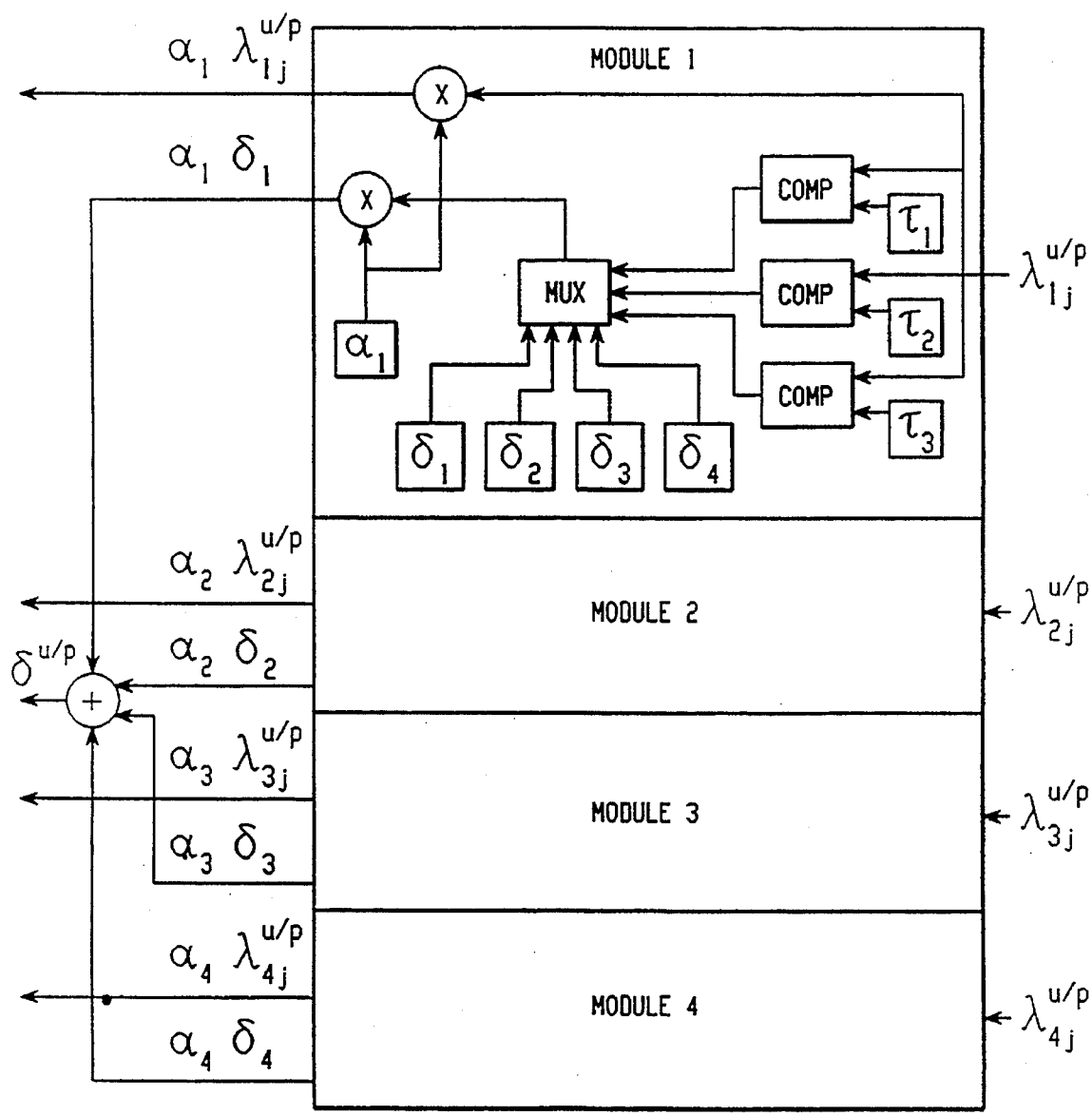
FIG. 3 is a schematic illustration of a preprocessing element for the VLSI architecture of FIG. 2.

The block diagram of the Preprocessing Processing Element (PPPE) is shown in FIG. 3. It receives four edge length ratios in parallel during every clock cycle, and outputs them after multiplying with the appropriate coefficient $\alpha_i$. It also identifies the range within which the edge length ratios lie in order to determine the proper threshold value $\delta_i$ to use in the combined dissimilarity measure computations. The PPPE contains four similar modules, one for each edge length ratio, and an adder. The modules only differ in the value of $\alpha_i$ they use during multiplication.

Each of the modules makes use of three comparators, a multiplexer, a register and two multipliers. The comparators identify the range within which the edge length ratios lie, and their outputs select the appropriate threshold value $\delta_i$. The edge length ratio and this $\delta_i$ are multiplied by the $\alpha_i$ that that module is responsible for. The $\delta_i\alpha_i$ outputs from all four modules are then added up and this composite threshold value $\delta$ is output along with the modified edge length ratios. The values used for $\delta_1$, $\delta_2$, $\delta_3$, $\delta_4$, are 0.03125, 0.0875, 0.25 and 1.25 respectively, and those used for $\tau_1$ $\tau_2$ $\tau_3$ are 0.5, 1.25 and 3 respectively. The $\alpha_i\lambda_{i,k}$ outputs are henceforth represented as $\lambda_{i,k}$, and the $$\sum_{i=1}^{4} (\alpha_i \delta_i)$$

output as $\delta$.

B. Matrix Element Computation

Figure 4:
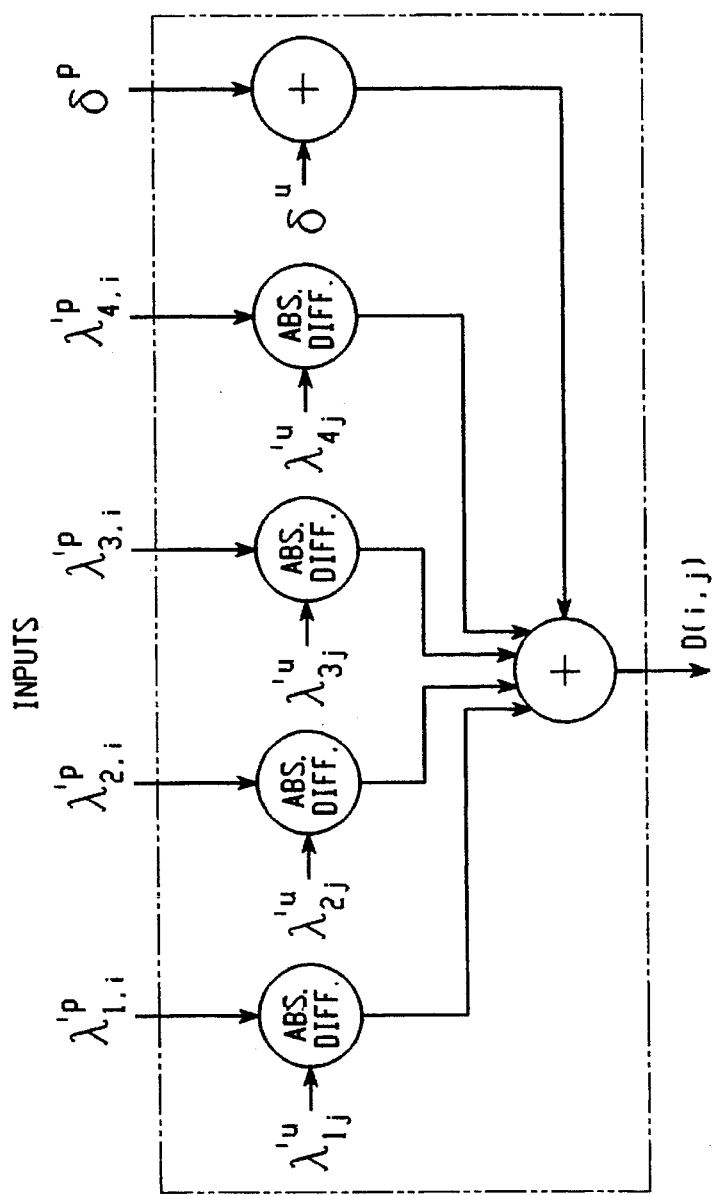
FIG. 4 is a schematic illustration of a matrix element computation processing element for the VLSI architecture of FIG. 2.
Figure 6A:
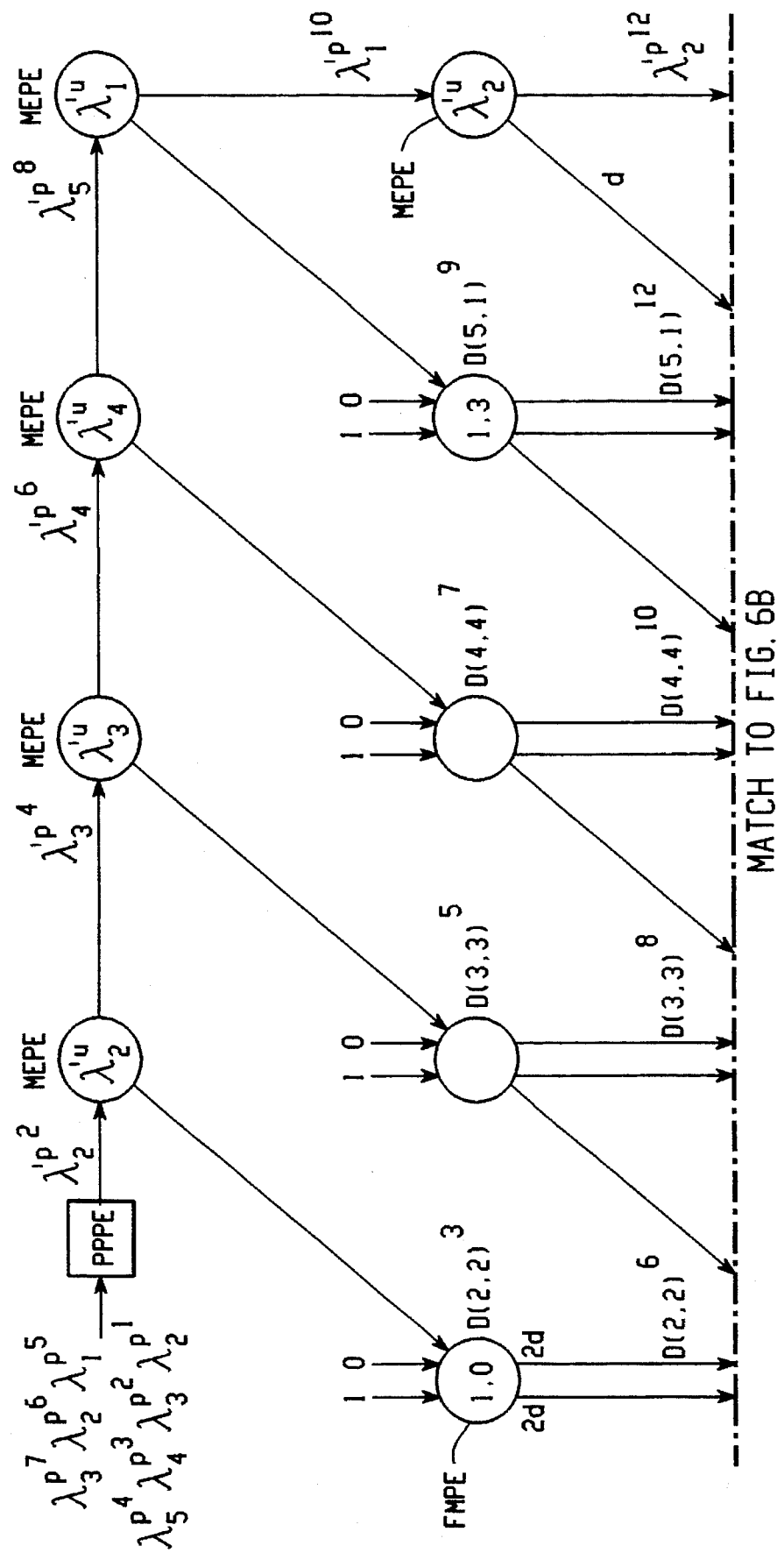
FIGS. 6A, 6B, 7A, and 7B are space-time diagrams for performing successive computations in the VLSI architecture of FIG. 2.
Figure 6B:
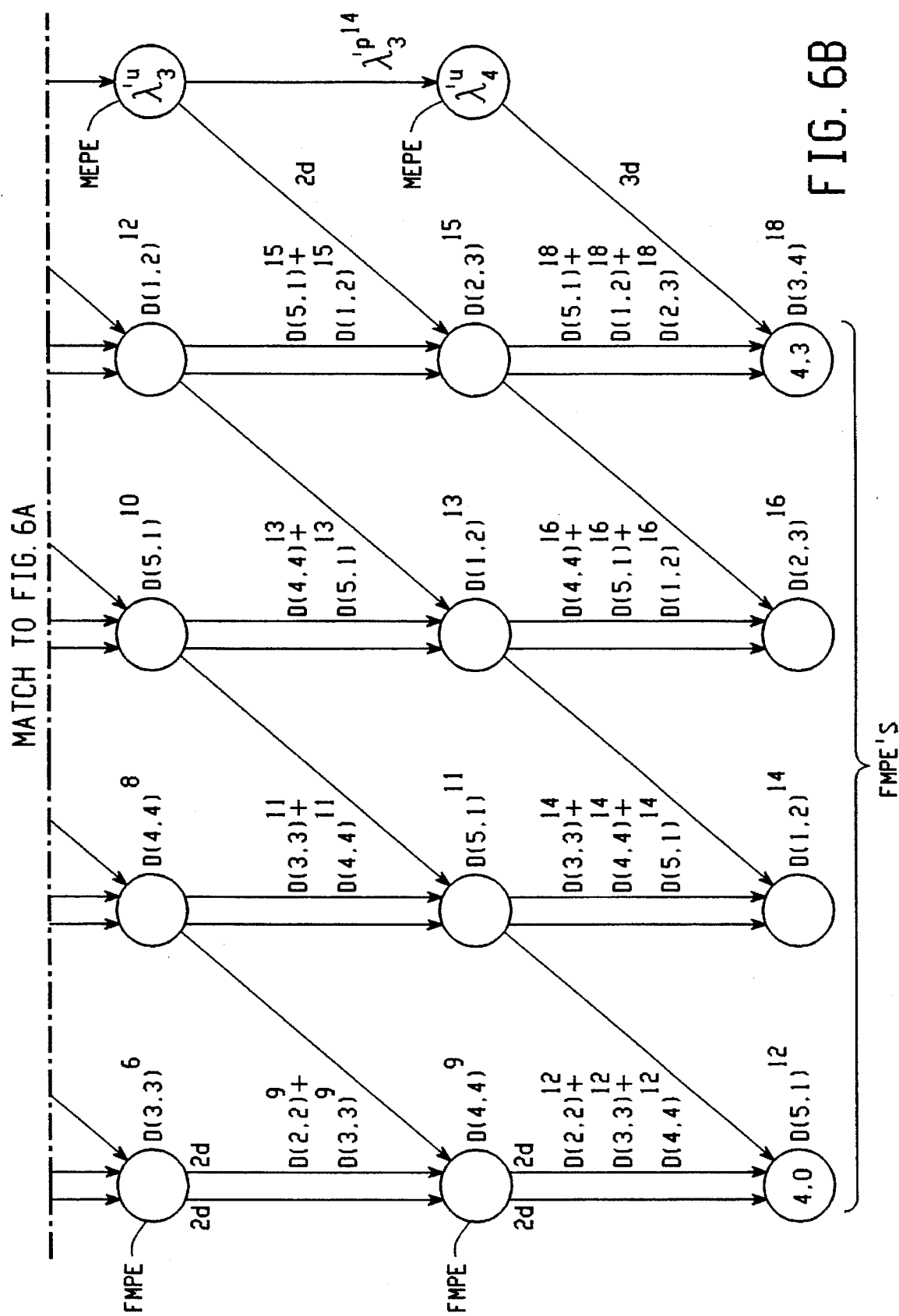
Figure 7A:
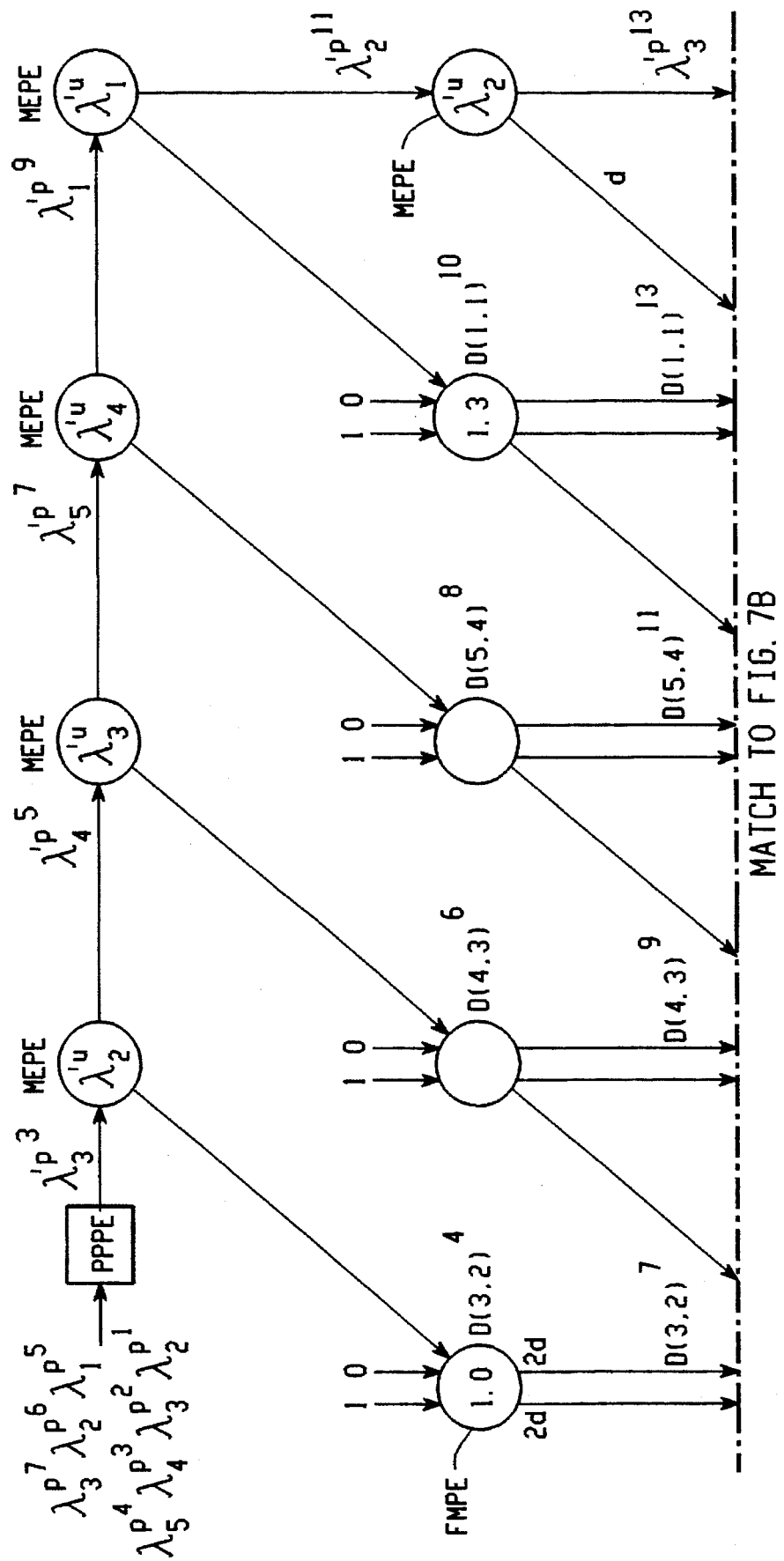
Figure 7B:
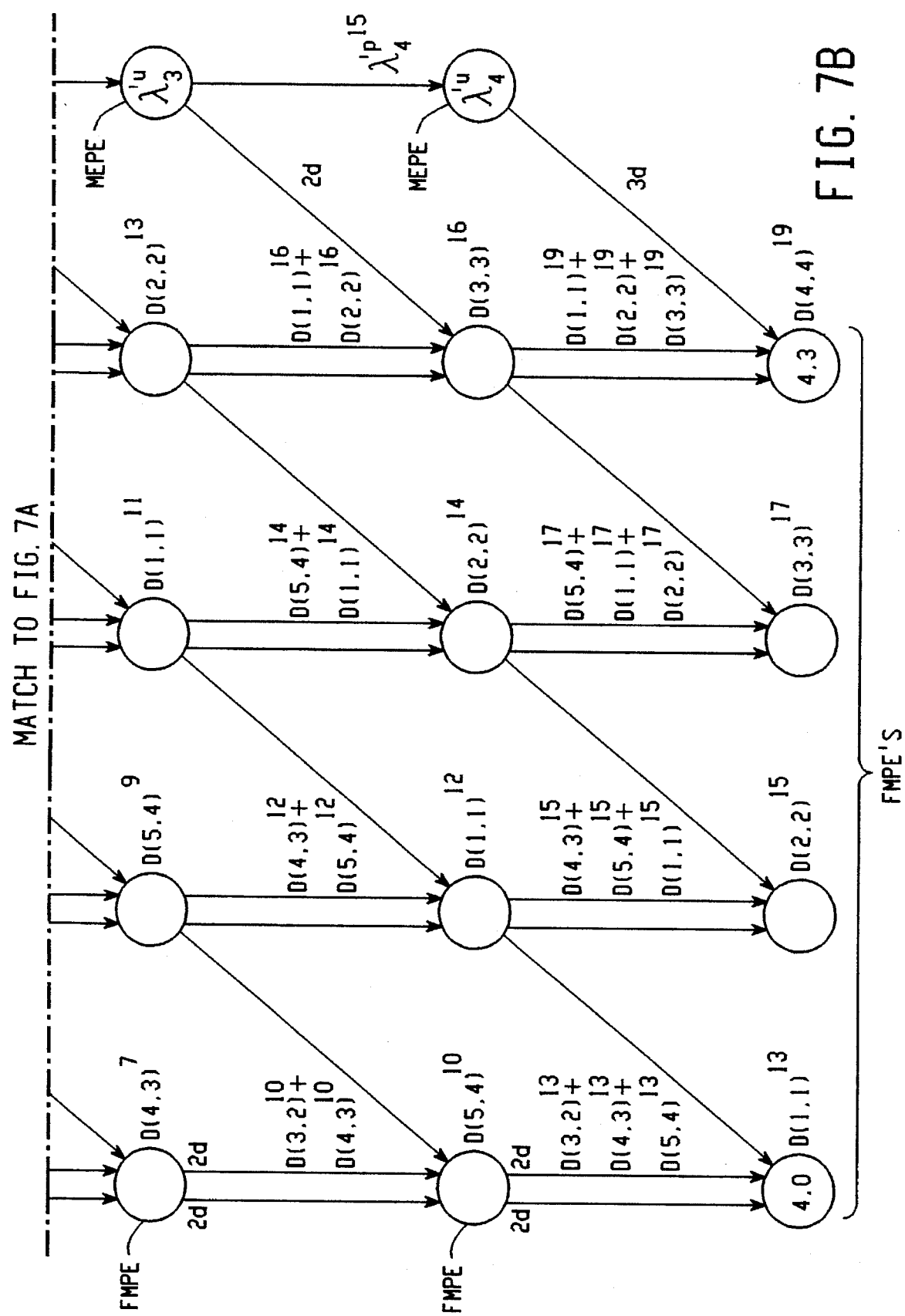

The block diagram of the Matrix Element Computation PE is shown in FIG. 4. It is assumed that a set of four edge length ratios of a known polygon contour p are input to the array in parallel during each clock cycle. The edge length ratios of the unknown contour are preloaded into the MEPEs, and MEPE(j−1) is preloaded with $(\lambda'^u_{1,j}, \lambda'^u_{2,j}, \lambda'^u_{3,j},$ $\lambda'_{4,j}{}^u$). If there are $n_u$ edge length ratios, they are stored within the MEPEs in the order ($\lambda'_{i,2}{}^u, \lambda'_{i,3}{}^u, \ldots, \lambda'_{i,n_u}{}^u, \lambda'_{i,1}{}^u, \lambda'_{i,2}{}^u, \ldots, \lambda'_{i,n_u}{}^u$) starting from the leftmost MEPE. The threshold value of $$\delta^u = \sum_{i=1}^{4} \alpha_i \delta_i$$

is also prestored within each MEPE. Once the edge length ratios for a particular unknown contour are loaded, partial contour matching can be performed with every known polygon contour before the edge length ratios for the next unknown contour are loaded into the array.

The edge length ratios of each known polygon contour are input to the MPEPs, one after another, in a sequential fashion. Assuming there are q known polygon contours, the ratios are input to the MEPEs in the following order: $\{(\lambda_{i,2}{}^{p1}, \lambda_{i,3}{}^{p1}, \ldots, \lambda_{i,n_p}{}^{p1}, \lambda_{i,1}{}^{p1}, \ldots, \lambda_{i,min(n_u,n_{p1})}{}^{p1}), \ldots, (\lambda_{i,2}{}^{pq}, \lambda_{i,3}{}^{pq}, \ldots, \lambda_{i,n_{pq}}{}^{pq}, \lambda_{i,1}{}^{pq}, \ldots, \lambda_{i,min(n_u,n_{pq})}{}^{pq})\}$. Thus, every cycle a new edge length ratio is input to the MEPEs. The sequence of edge length ratios (and corresponding threshold values) are shifted through the MEPEs from left to right. Thus while $\lambda_i^p$ is in MEPE(j), $\lambda_{i+1}^p$ in MEPE(j−1) and so on. Clearly, MEPE(j) computes D(i,j), $1 \leq i < n_p + min(n_p + n_u)$.

The hardware processing technique is described in the next subsection in a formal manner which also serves to establish the correctness of the overall computation.

C. Hardware Architecture Processing Technique

Lemma 1 establishes the time at which a particular edge length ratio of the prototype reaches an MEPE. Lemma 2 states when a particular matrix element arrives at the corresponding FMPE. Theorem 1 describes the computations performed by an FMPE and the time at which this computation is performed. The Theorem and Lemmas together describe the hardware architecture processing technique in a formal manner. An example trace of the hardware architecture processing technique is given in Section E below.

Lemma 1 $\lambda_i^p$ meets with $\lambda_j'^u$ at MEPE(j=1) at time T=i+j−2, and D(i,j) is output at T=i+j−1.

Proof. $\lambda_i^p$ is input to the system at T=i−1. $\lambda_i^p$ is output by the Preprocessing PE at T=i. $\lambda_j'^u$ is prestored in MEPE(j−1). Therefore it will take another j−2 time units before $\lambda_i^p$ arrives at MEPE(j−1). D(i,j) is output during the next cycle at T=i+j−1. □

Lemma 2 D(k,j) arrives at the Diagonal input of FMPE(i, j−i−1) at time T=k+j+i−2.

Proof. From Lemma 1, D(k,j) is output by MEPE(j−1) at T=k+j−1. From FIG. 2 it can be seen that it takes another i−1 time units for D(k,j) to reach the Diagonal input of FMPE(i, j−i−1). □

Theorem 1 $FMPE(i, j-1)$ computes $\sum_{l=1}^{i} D(k+l, j+l)$, $1 \leq i \leq n_u$ at time $T = k + j + 3i - 2$.

Proof. We prove this theorem by induction on i. Basis:—From Lemma 1, D(k+1,j+1) is output by MEPE(j) at T=k+j+1. From Lemma 2, D(k+1,j+1) reaches the Diagonal input of FMPE(1,j−1) at T=k+j+1. The Data inputs for FMPE(1, m), $1 \leq m \leq N-1$ are hardwired to 0. Thus, FMPE(1,j−1) computes $$\sum_{l=1}^{1} D(k+l, j+l) = D(k+1, j+1) \text{ at } T = k+j+1.$$

Inductive Hypothesis:—Assume the above is true for i=m(i.e. FMPE(m,j−1).

From the inductive hypothesis, $$\sum_{l=1}^{m} D(k+l, j+l)$$

is generated by FMPE(m,j−1) at T=k+j+3m−2. This output reaches the Sum input of FMPE(m+1,j−1) after an additional 3 time units, i.e. at T=k+j+3(m+1)−2. From Lemma 2 we see that D(k+m+1,j+m+1) will reach the Diagonal input of FMPE(m+1,j−1) at T=k+m+1+j+m+1+m+1−2=k+j+3(m+1)−2. FMPE(m+1,j−1)then adds the two inputs, Sum and Diagonal, to generate $$\sum_{l=1}^{m} D(k+l, j+l) + D(k+m+1, j+m+1) =$$

$$\sum_{l=1}^{m+1} D(k+l, j+l) \text{ at } T = k+j+3(m+1) - 2.$$

Therefore the proof is completed. □

Corollary 1 FMPE(i,k), $1 \leq k < n_u$ perform feasible match computations ((m, k+1),i),$1 \leq m \leq n_p$, $1 \leq i \leq min(n_p, n_u)$.

Proof. This result follows from Theorem 1. □

Theorem 1 establishes what computations each FMPE performs and in the following section, it is described how this computation is actually achieved by each FMPE.

D. Feasible Match Computation

Figure 5:
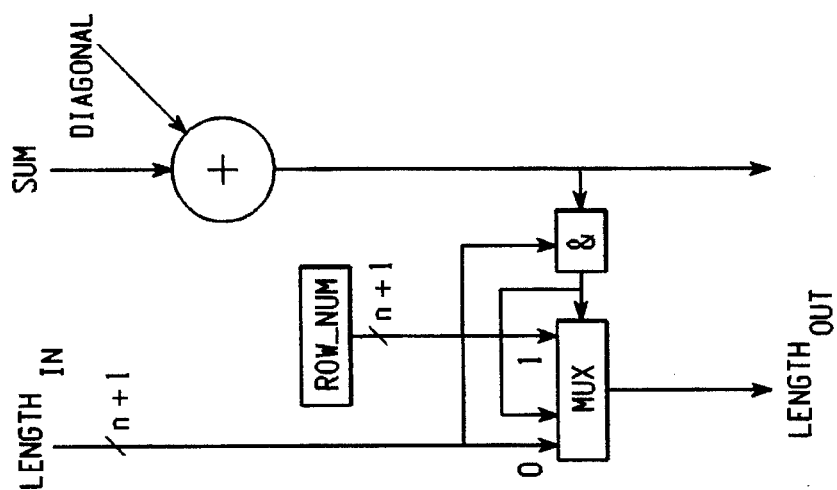
FIG. 5 is a schematic illustration of a feasible match computation processing element for the VLSI architecture of FIG. 2.

The block diagram of the Feasible Match PE is shown in FIG. 5. The interconnections between the FMPE's allow a matrix element to rendezvous with every matrix element along that diagonal.

The length$_{out}$ output from an FMPE represents the length of the contour that has been matched up to that point. The length inputs and outputs are (n+1) bits wide, where the Least Significant Bit (LSB) is a tag bit, and the other n bits indicate the length of the partial match. Each FMPE also has a register row_num which is prestored with the row number of the FMPE in the array (For PE(i,j) row_num=i), and has its tag bit set to a 1. The tag bits for the length$_{in}$ inputs for the first row of FMPE's are also set to a 1.

The two inputs, Diagonal and Sum, are added, and the sign of the result is inspected. If negative $$\left( \text{i.e. } \sum_{l=1}^{m} D(i+l, j+l) < 0 \right),$$

it indicates that a feasible match criteria has been satisfied and is still continuing for consecutive edges of the unknown contour with one of the known polygon contours, and the value stored in the register row_num is latched and connected to the length$_{out}$ output. Otherwise, it indicates the predetermined feasible match criteria has been satisfied for a number of consecutive edges of the unknown contour with one of the known polygon contours but is no longer continuing, in which case the length$_{in}$ input is latched and connected to the length$_{out}$ output. Once the result of the addition becomes positive (greater than the threshold), the length$_{out}$ value should not be modified till it is output. This is made possible by setting the tag bit of length$_{out}$ to 0 as soon as the adder's output becomes positive. Thenceforth, at subsequent FMPE's, the length$_{in}$ input gets directly switched to the length$_{out}$ output till it reaches the bottom of the array. This value represents 1, the length of the unknown contour that matched the known polygon contour.

The outputs of the last row of FMPEs are provided to a Comparator Network, shown in FIG. 2. This Network identifies the longest feasible match, and outputs that value to the host after all the computations for the known polygon contours are completed. The operation of the Comparator Network is described in the next subsection.

E. Example Demonstrating the Data Flow

In order to show the data flow in this architecture, two space-time diagrams are shown in FIGS. 6A, 6B, 7A and 7B. A superscript notation has been used to represent the time step. The figures show space time diagrams for performing two successive computations. It has been assumed that the unknown contour has 4 edges and that a known polygon contour has 5. The diagrams demonstrate how the fast and slow channels enable a matrix element to meet with preceding and succeeding diagonal elements. The $\delta^{u/p}$ values have not been shown in the figures to improve the readability. It can be seen that the values reaching the Diagonal and Sum inputs of the FMPEs are the correct ones required for the computations. It is can also be observed that an FMPE's row number represents the length of the feasible match computation it performs.

The FMPEs operate as described in the previous subsection. For example, at T=6 the operation of FMPE(2,0) is as follows. It adds the two inputs D(2,2) and D(3,3), and inspects the sign of the result. If negative, the value 2 (the value stored in the row_num register is switched to length$_{out}$, and the tag bit of length$_{out}$ is set to 1. Otherwise, the n most significant bits of length$_{in}$ are switched to those of length$_{out}$, and its least significant bit (tag bit) is set to 0. However, if at T=3 FMPE(1,0) had found D(2,2) to be positive it would have set the tag bit of its length$_{out}$ to a 0. In this case, all subsequent FMPEs would automatically switch their length$_{in}$ input to their length$_{out}$ output, and set the tag bit of length$_{out}$ to a 0. Thus, the first FMPE to identify that the threshold for a feasible match has been crossed will set the tag bit to a 0. The length of the feasible match, equal to the length$_{in}$ value at that FMPE, will then not be modified by subsequent FMPEs.

F. Implementation Issues and Performance

The architecture described above is simple and regular. It receives four inputs in parallel (the edge length ratios) each cycle, and outputs the longest feasible match triple. The architecture of FIG. 2 with an N×N array of FMPEs and 2N−1 MEPEs can process unknown contours with up to N edges. Further, known polygon contours with an arbitrary number of edges can be processed by this architecture.

The range of values that the edge length ratios take can be restricted to some range. In applicants' experimental studies, the edge length ratios varied between −20 and +20. Further, the edge length ratios were rounded off to 6 digits of precision. Thus, 24 or 32 bits (depending upon the precision required) can be used to represent each edge length ratio. This implies that 96 or 128 input pins are required for all 4 edge length ratio inputs. The architecture provides one output to the host. This output is a feasible match triple ((i,j),l), where i,j, and l require $\lceil \log_2(N+1) \rceil$ bits each. Besides these, clock, power and reset inputs are also required.

The implementations can be further simplified as explained below. In the PPPEs, if equal importance is given for all edge length ratios, i.e. $\alpha_i$=0.25, i=1, . . . ,4, then the multipliers are not necessary. All that needs to be done is to shift the edge length ratio and the threshold $\delta_i$ value right by two places. This can be achieved by appropriately hardwiring the connections. Similarly, the threshold $\delta_i$ inputs to the multiplexer and the $\tau_i$ inputs to the comparators can also be hardwired. In the FMPEs, a register is not required for storing row_num, since it is fixed for a given row. Instead, the row number can be hardwired, saving considerable space.

If the host performs the preprocessing required by the proposed polygon recognition technique, the PPPE can be omitted. In such a situation, a known polygon contour would require an additional threshold value $\delta$ to be input along with the edge length ratios. A major advantage of this architecture is that absolutely no control is required. The data flow is systolic, and computations are performed using whatever inputs are present at that time instant.

G. Performance

This section examines the pipeline delay till the first output is produced, the time at which the last output is produced and the block pipelining periods. The indices of the MEPEs vary between 1 and 2N−1, and the N×N array of FMPEs has indices varying between (1,0) to (N,N−1).

(i) The first output, feasible match ((1,1),l), is computed by FMPE(N,O) at T=3N and output to the comparator array at T=3N+1. This result follows from Theorem 1. Thus, there is a pipeline delay of 3N cycles.

(ii) Similarly, the last output, feasible match (($n_p$,$n_u$),l), is output by FMPE(N,$n_u$−1) at T=3N+$n_p$+$n_u$−1. From this and the previous result, it can be observed that $n_p$+$n_u$−2 clock cycles after the first feasible match is output by the FMPE array, all the feasible match triples are computed.

(iii) Again, based on Theorem 1, the last output from FMPE(N,0) (the first column of FMPEs) is generated at T=3N+$n_p$.

(iv) It is obvious from Theorem 1 that there is a delay of 1 cycle between FMPE(N,m) outputting the first (last) feasible match and FMPE(N,m+1) doing the same.

Since only the longest feasible match for any given prototype needs to be reported to the host, and in order to reduce the number of output pins, Postprocessing is performed by the Comparator Network shown at the bottom of FIG. 2.

Figure 8A:
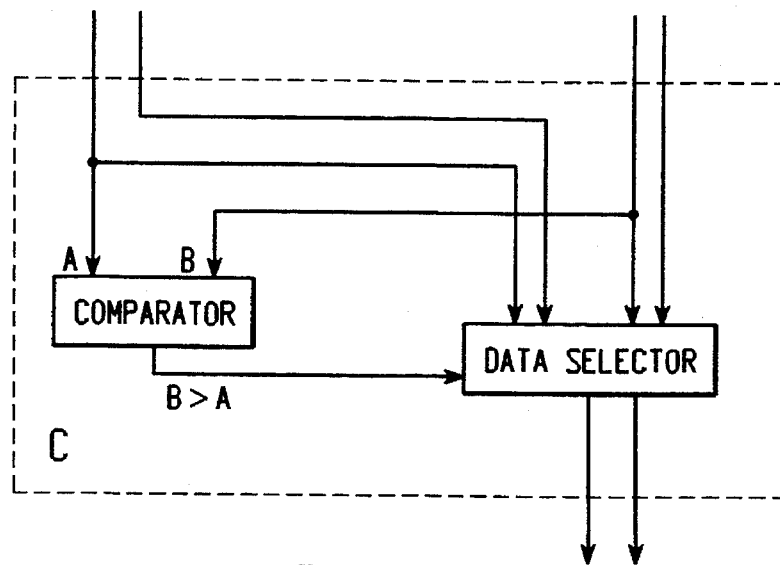
FIGS. 8A and 8B are diagrams of comparator network components for the VLSI architecture of FIG. 2.

The length$_{out}$ outputs from the last row of FMPEs and the column numbers are connected to a network of N−1 Comparator Stages (C) as shown in FIG. 2. It can be observed that the N−1 comparator stages compare the n-th outputs from all of the columns and select the longest feasible match from amongst them. Further, the n-th output from column j represents the feasible match ((n,j),l). Thus, the output from the last Comparator Stage represents the longest feasible match ((i,j),l) $1 \leq j \leq N$. The block diagram of a Comparator Stage is shown in FIG. 8A. It compares the two length (l) inputs (A and B in the FIG. 8A), and outputs the larger of the two along with its associated column number (j) to the next Comparator Stage during the next clock cycle.

Figure 8B:
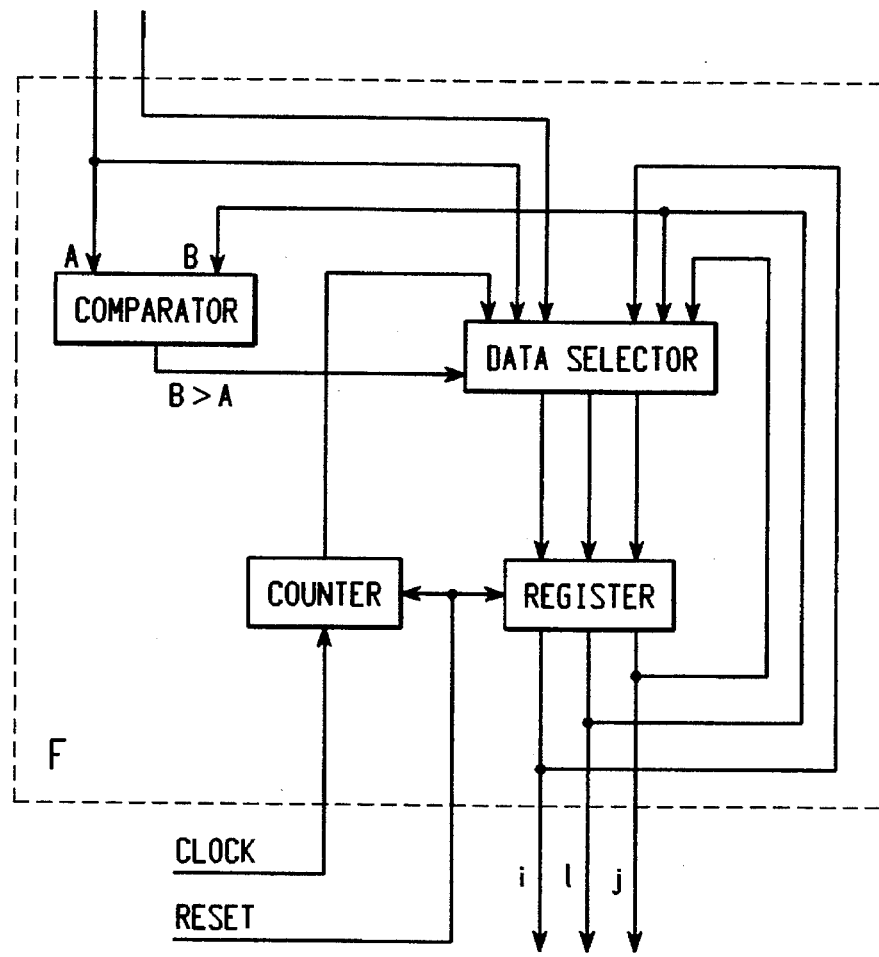

The output of the last Comparator Stage is connected to the Final Stage (F), whose block diagram is shown in FIG. 8B. The input to the Final Stage represents the longest feasible match determined by the architecture during the previous clock cycle. The Final Stage contains a comparator, counter, data selector and register as shown. The register stores the value of the longest feasible match triple ((i,j),l) detected up to that point. A counter is used to determine the value of i in the feasible match triple. During each clock cycle, the length of the feasible match from the last Comparator Stage is compared with the length of the longest feasible match detected up to that point (available in the register). The register is updated with the result from the comparison as shown in the figure. After the last output from the Comparator Stages has been processed, the register contains the longest feasible match triple for that prototype. This value is output to the host.

In order to synchronize computations, the register and counter need to be reset 4N cycles after the first input is provided for a known polygon contour, since this is when the first valid output is produced by the last Comparator Stage. The feasible match result from the Final Stage needs to be read after a further $n_p$−1 cycles. Thus, the Comparator Network determines the longest feasible known polygon contour for a prototype with $n_p$ edges in $n_p-1$ cycles. These observations follow from the results presented above. However, $n_p-1+\min(n_u,n_p)$ cycles are required to input the edge length ratios for each known polygon contour. Therefore, the time estimate for processing P known polygon contours is $$\sum_{i=1}^{P} (n_{pi} + \min(n_u, n_{pi}) - 1).$$

Figure 9A:
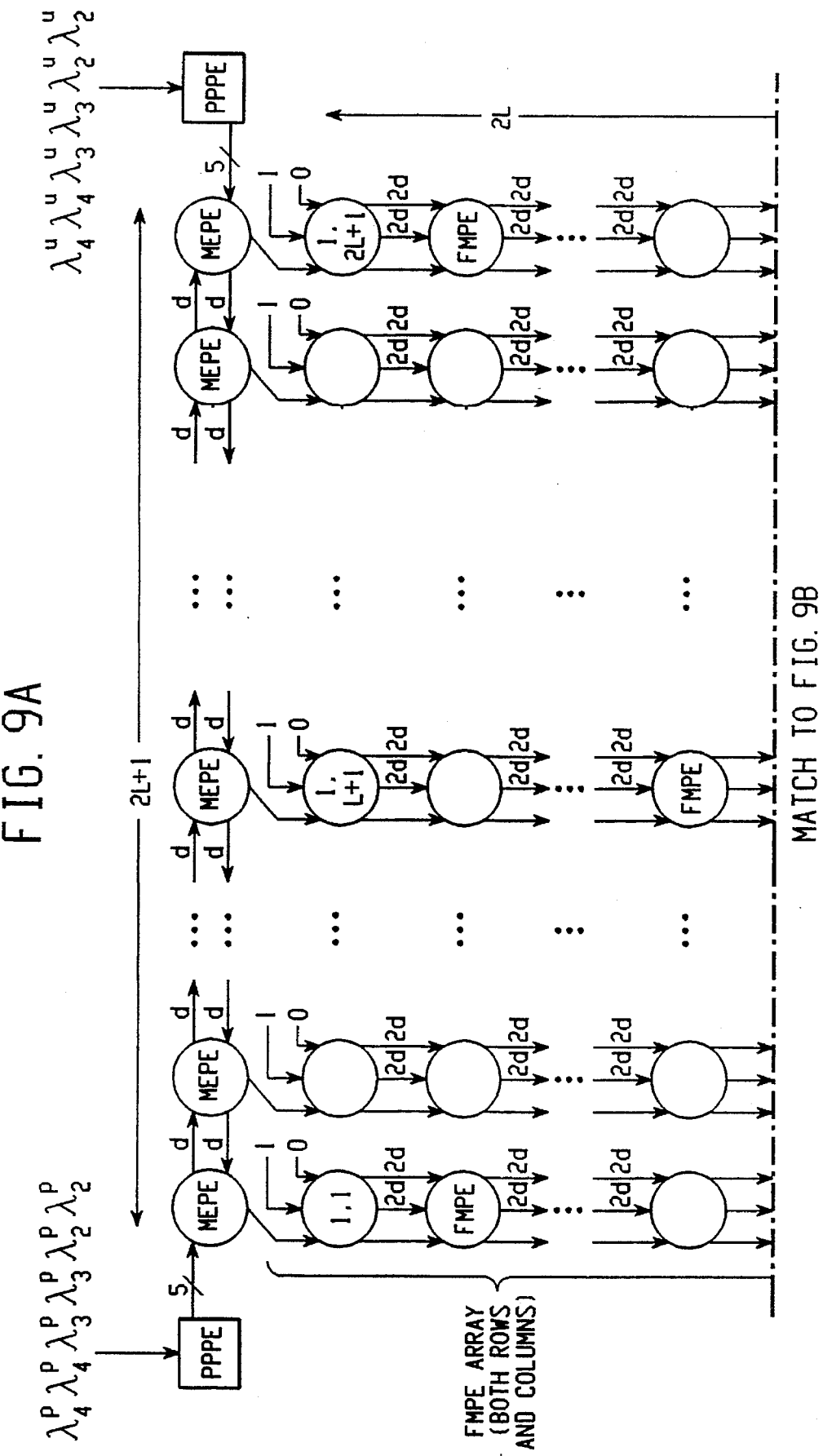
FIGS. 9A and 9B are a schematic illustration of another VLSI architecture for implementing the technique of the present invention.
Figure 9B:
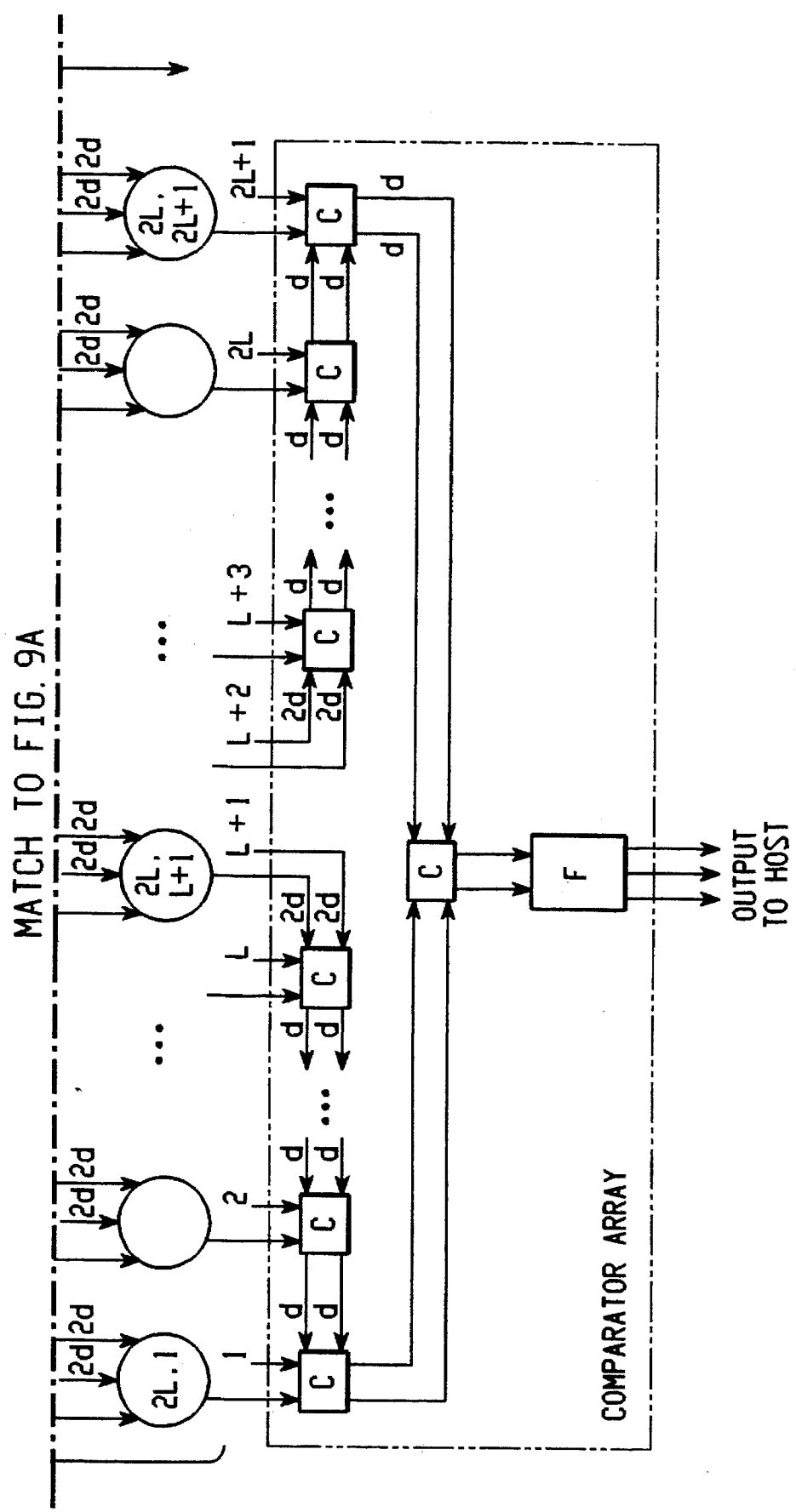

VIII. VLSI Architecture 2 (FIGS. 9A AND 9B)

In this architecture, the edge length ratios of both the known polygon contours and unknown contours are input from opposite ends. The edge length ratios of the known polygon contours and unknown contours move in opposite directions within the first row of MEPEs. In order to enable each edge length ratio of the unknown contour to meet with each edge length ratio of the known polygon contours, they must be separated by one cell, such that alternate cells are idle at any time. This implies that new values are required to be input only during alternate cycles. The disadvantage with this scheme is that the utilization is only 50%. However, if the same value is provided during two consecutive clock cycles, then by sharing processors it is possible to reduce the hardware by half while increasing the utilization to 100%. In this architecture, new inputs are provided only once in two clock cycles, but they are maintained constant for two cycles.

Instead of having a column of PEs for each column of $D(i,j)$ this architecture makes use of a column of PEs for two diagonals of $D(i,j)$. This simplifies feasible match computations, as these are performed only within diagonal elements. Thus, this architecture does not require communication between neighboring columns within the feasible match computation block. It can be viewed as a collection of linear systolic arrays, where the outputs from one are fed as inputs to the others. This makes the architecture extremely regular and scalable. A detailed description of the various components of this architecture and the hardware algorithm is presented next.

A. Matrix Element Computation

Data is input to the first row from both ends. From the left the edge length ratios for the known polygon contours are input, and from the right those for the unknown contour. These inputs are held for two consecutive clock periods, i.e., a new value is provided only every other cycle. The edge length ratios for the unknown contour are delayed by one cycle with respect to those for the prototype (see FIGS. 9A and 9B). The edge length ratios of the known polygon contours and unknown contours are preprocessed by the PPPEs on either end of the array, exactly as in the previous architecture.

Figure 10:
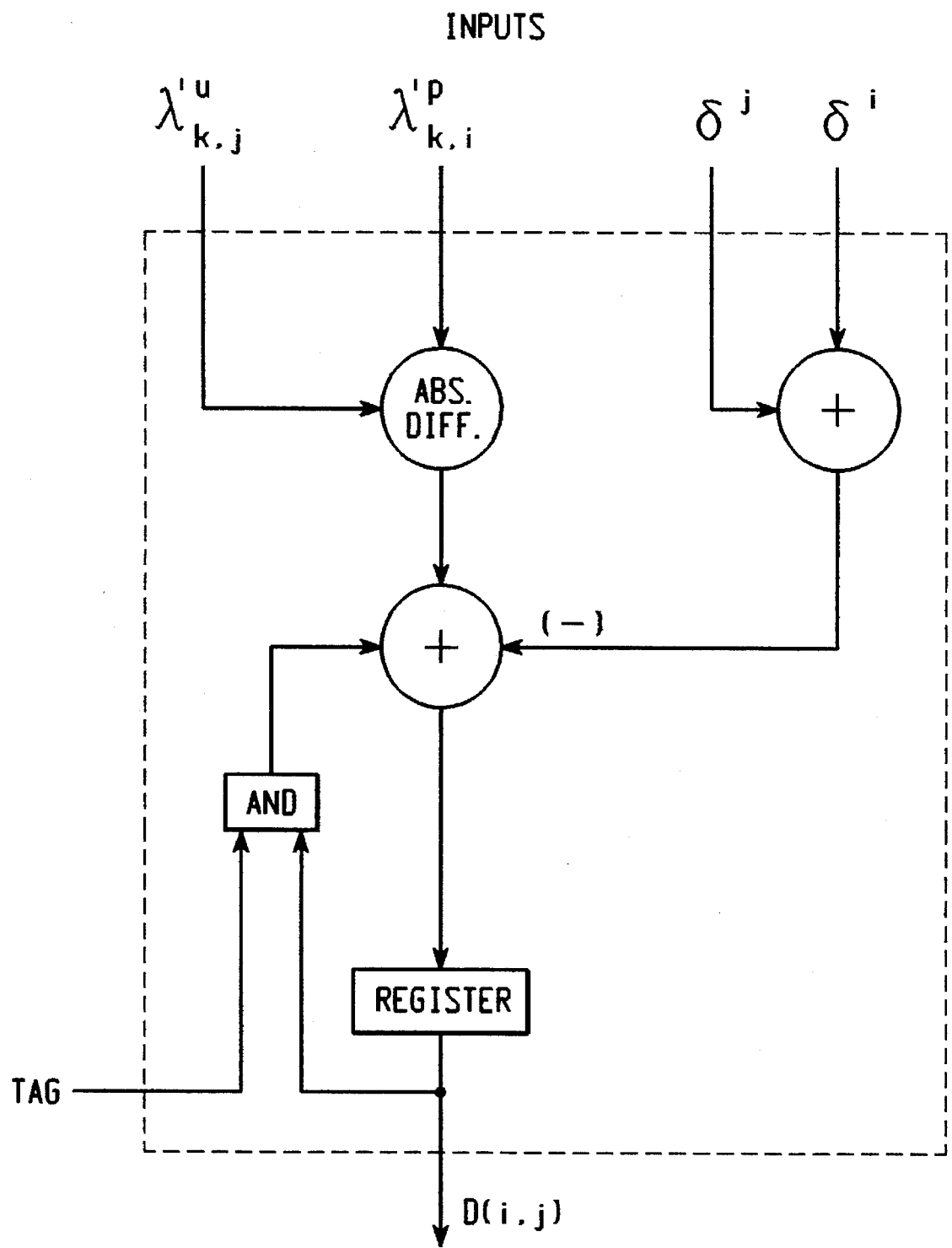
FIG. 10 is a schematic illustration of a matrix element computation processing element for the VLSI architecture of FIGS. 9A and 9B.

The block diagram of the Matrix Element Computation PE (MEPE) is shown in FIG. 10. It is very similar to the MEPE of the previous architecture except that it gets edge length ratios for both the unknown contour and the known polygon contours as inputs.

B. Hardware Algorithm

Lemma 3 states when a particular edge length ratio of a known polygon contour reaches an MEPE. Lemma 4 does the same thing for edge length ratios of the unknown contour. Theorem 2 then establishes what computations each MEPE performs. The Theorem and Lemmas together state the hardware processing technique in a formal manner. An example trace is shown in Section D.

Consider an architecture with 2L+1 MEPEs and a 2L×(2L+1) array of FMPEs.

Lemma 3 $\lambda'^p_i$ arrives at MEPE(j) at T=2(i+j)−4, 2(i+j)−3.

Proof. $\lambda_i^p$ is input to the system at T=2i−3 and T=2i−2. $\lambda'^p_i$ is generated by the preprocessing PE (PPPE) after one time unit, i.e. at T=2i−2 and T=2i−1. It reaches FMPE(j) after another 2(j−1) time units, i.e. at T=2(i+j)−4 and T=2(i+j)−3. □

Lemma 4 $\lambda'^u_i$ arrives at MEPE(j) at T=2(i+2L−j)+1, 2(i+2L−j)+2.

Proof. $\lambda_i^u$ is input to the system at T=2i−2 and T=2i−1, $\lambda'^u_i$ is generated by the Preprocessing PE (PPPE) after one time unit, i.e. at T=2i−1 and T=2i. It reaches MEPE(j) after another 2(2L+1−j) time units, i.e. at T=2(i+2L−j)+1 and T=2(i+2L−j)+2. □

Theorem 2 MEPE(j) computes D(i,k) where $$i=k+2(L-j)+3,\ k+2(L-j)+2$$

Proof. Consider MEPE(j). From Lemma 3, $\lambda'^p_i$ will reach MEPE (j) at $$T=2(i+j)-4 \quad (1)$$

$$T=2(i+j)-3 \quad (2)$$

From Lemma 4, $\lambda'^u_k$ will reach MEPE(j) at $$T=2(k+2L-j)+1 \quad (3)$$

$$T=2)k+2L-j)+2 \quad (4)$$

Equating (1) and (4) we get i=k+2(L−j)+3.
Equating (2) and (3) we get i=k+2(L−j)+2. □

Thus, each MEPE performs computations for two diagonals of the matrix. For example, the central MEPE (j=L+1) performs computations for the two diagonals starting at D(1,1) and D(2,1), the MEPE just to its left (j=L) performs computations for the two diagonals starting at D(3,1) and D(4,1), while the one to its right (j=L+2) computes the diagonals starting at D(1,2) and D(1,3).

C. Feasible Match Computation

The feasible match computation PE's (FMPE) are identical to the ones used by the previous architecture. The only difference is in the interconnection; the value for the Diagonal input in this architecture is obtained from the previous FMPE and not from the diagonal FMPE. Each FMPE interleaves the feasible match computations for two consecutive diagonals. Since new values for each diagonal are available only once in every two cycles, a relative delay of 2 time units is maintained between the fast and slow channels as shown in FIGS. 9A and 9B.

D. Example demonstrating the Data Flow

Figure 11:
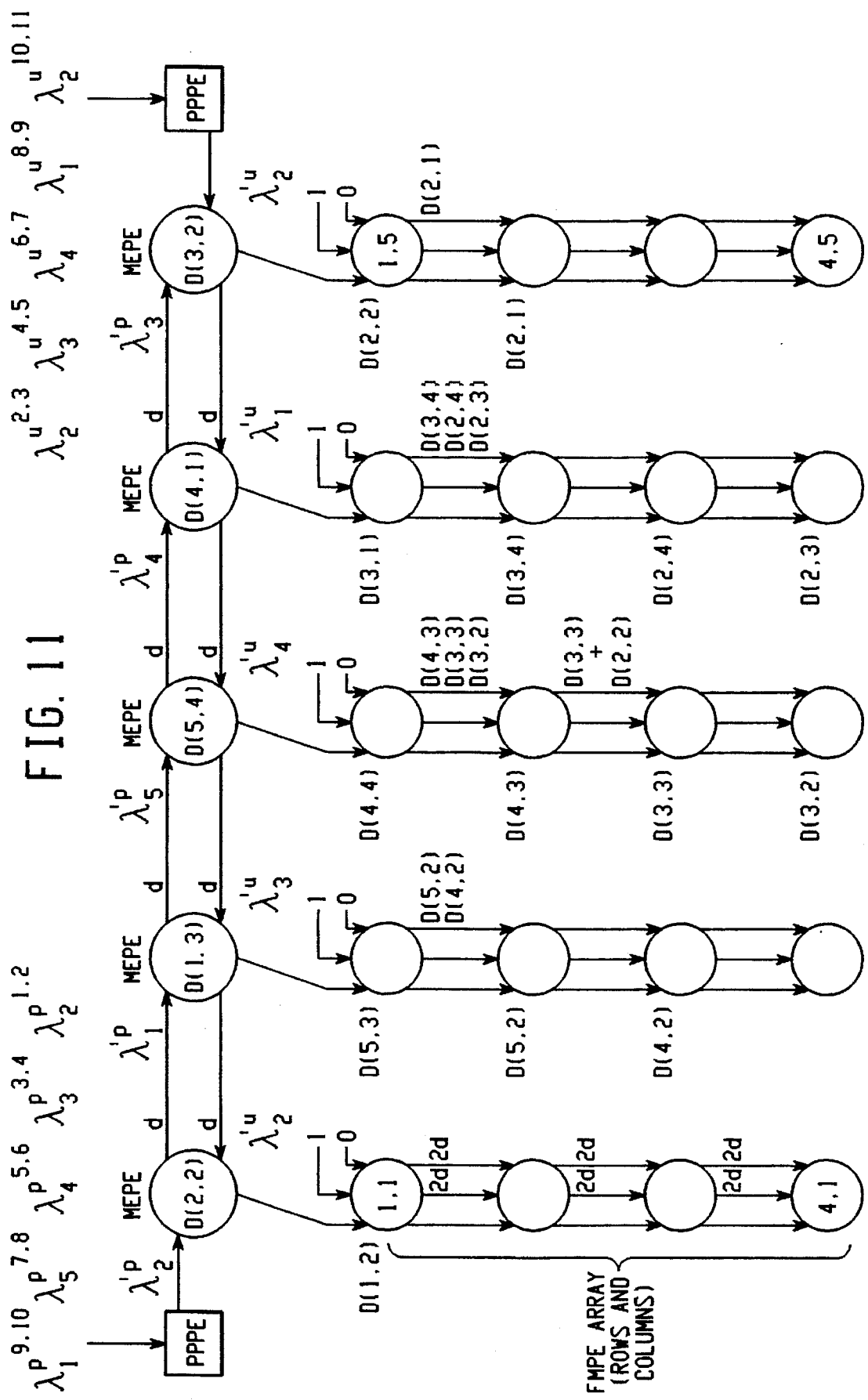
FIG. 11 and 12 are illustrations of data flow in the VLSI architecture of FIGS. 9A and 9B.
Figure 12:
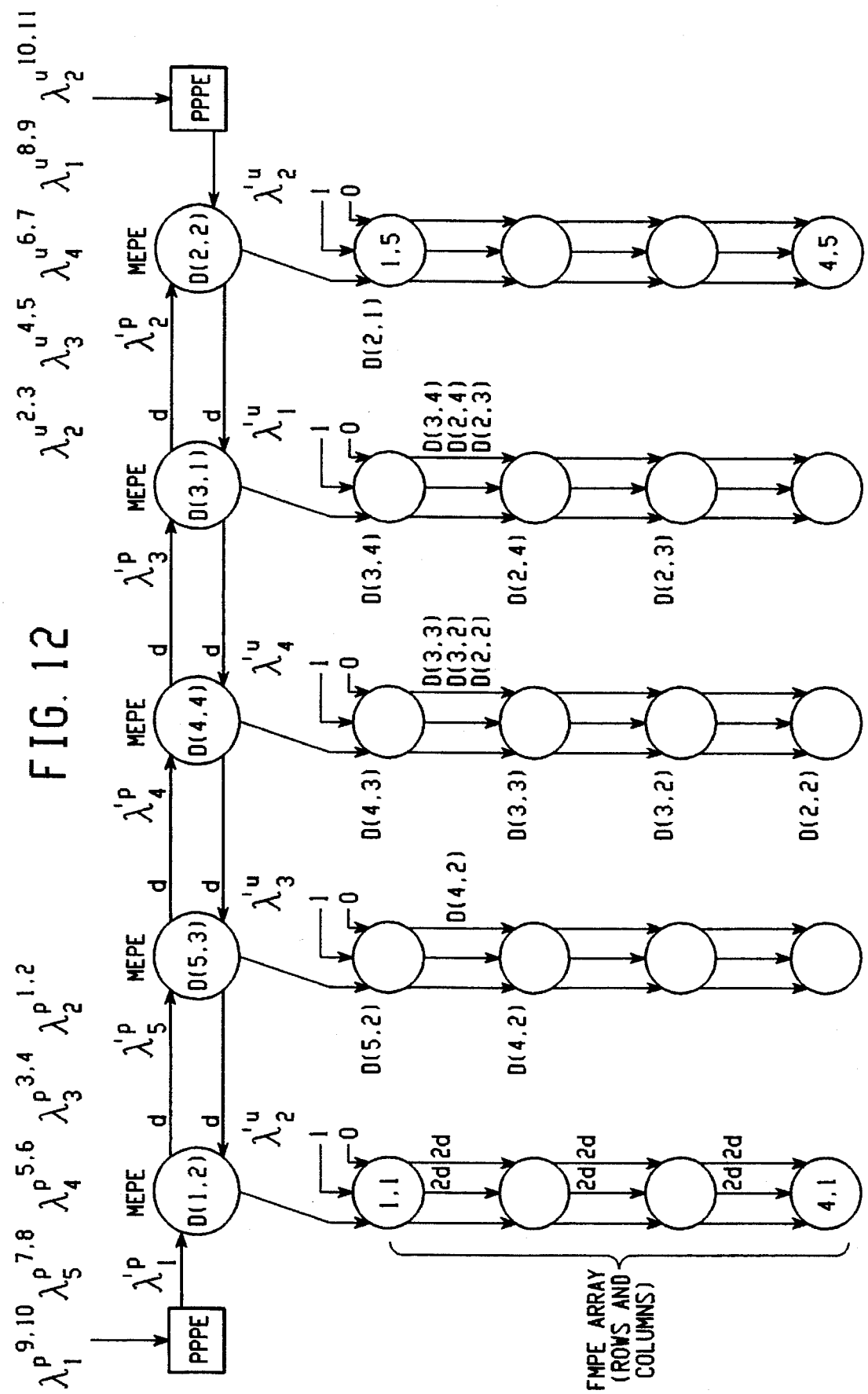

The data flow is illustrated in FIGS. 11 and 12. The figures show snapshots of a system at T=11 and T=12 respectively. The value shown within the circle representing an MEPE is the matrix element that is currently being computed by that MEPE. It can be seen from the figures that each MEPE and FMPE performs computations for two consecutive diagonals of the D matrix in an interleaved fashion. The values shown between two successive FMPEs represent the outputs of the first FMPE and the two registers between them. The figures clearly demonstrate how the fast and slow channels enable a matrix element to meet with preceding and succeeding diagonal elements.

E. Implementation Issues and Performance

The architecture does not waste clock cycles in loading the unknown input edge length ratios into the array, as was required by the previous architecture. The absence of cross connections within the FMPE array makes this systolic array processor very attractive for this computationally intensive application. It is modular and regular. An implementation of this architecture with 2L+1 MEPEs and a (2L+1)×2L array of FMPEs can accommodate prototypes with up to 2L+2 edges, and unknown inputs with up to 2L+1 edges.

Only 4 inputs for the edge length ratios are required for this architecture, too. This is possible because new inputs are provided once in two cycles, and the inputs for the known polygon contours and unknown contour are staggered by a cycle. Thus, the inputs can be multiplexed between the known polygon contours and unknown contour. The hardware implementation can be simplified as in the previous architecture. This architecture too has the advantage that it requires absolutely no control.

F. Performance

In examining the performance of this architecture, it is assumed that $n_p \leq 2L+2$ and $n_u \leq 2L+1$.

(i) From Lemma 4 we observe that $\lambda'^u_2$ arrives at MEPE(L+1) at T=2L+3. From Lemma 3 we see that at this time $\lambda'^p_2$ also arrives at MEPE(L+1) and D(2,2) is computed. This value reaches FMPE(1,L+1) during the next cycle at T=2L+4 when feasible match ((1,1),1) is computed. It takes another (2L-1)*3+1 cycles before ((1,1),L) is finally output by FMPE(2L,L+1). Thus, the first output is produced by FMPE array at T=8L+2.

(ii) Based on similar reasoning, it can be observed that the first outputs are produced by FMPE(2L,M), L+1<M≤2L+1 at T=6L+2M-1, and by FMPE(2L,N), 1≤N<L+1 at T=10L-2N+4. Subsequently, each FMPE produces an output during every clock cycle. Thus, FMPE(2L,1) produces its first output at T=10L+2, and FMPE(2L,2L+1) at T=10L+1.

(iii) The last feasible match $((n_p,n_u),1)$ is output by

FMPE(2L,L+1+⌈($n_u-n_p$)/2⌉), if $n_u \geq n_p$ or

FMPE(2L,L+1-⌈($n_p-n_u-1$)2⌉), if $n_p > n_u$

This follows from Theorem 2. The index of the MEPE that computes $D(n_p+1, n_u+1)$ depends upon the sign and magnitude of $n_u-n_p$.

Since the number of edges in the unknown contour will normally be greater than those in the known polygon contours, this analysis is performed only for this case. The other case can be dealt with in a similar fashion. From Lemma 4 it is observed that $\lambda'^u_{[n_u+1]}$ arrives at MEPE(L+1+⌈($n_u-n_p$)/2⌉) at $T=2(n_u+L-⌈(n_u-n_p)/2⌉)+1$, and $T=2(n_u+L-⌈(n_u-n_p)/2⌉)+2$. The exact instant at which $D(n_p+1,n_u+1)$ is computed depends upon whether $n_p$ is even or odd. Taking the worst case time, it can be observed that $D(n_p+1,n_u+1)$ is output by MEPE(L+1+⌈($n_u-n_p$)/2⌉) at T=2($n_u+L-⌈(n_u-n_p)/2⌉$)+3. Feasible match $((n_p,n_u),1)$ is then output by the last FMPE in that column after another (2L-1)*3+1 cycles, i.e. at T=8L+2($n_u-⌈(n_u-n_p)/2⌉$)+1. Thus, 2($n_u-⌈(n_u-n_p)/2⌉$) cycles after the first output is produced, the architecture completes computing all the feasible match triples.

The Comparator Network shown in FIGS. 9A and 9B has been designed based on the results outlined in (ii) above. The N-1 comparator stages (C) compare the n-th outputs from all the columns, and pass on the longest feasible match amongst those to the Final Stage (F). The register and counter in the Final Stage are reset 10L+3 cycles after the first inputs are provided to the architecture. The longest feasible match can be read from the Final Stage after another 2 min(($n_u,n_p$))−1 cycles. Thus, the comparator array outputs the longest feasible match in 2 min(($n_u,n_p$))−1 cycles. However, the actual time required to process a single known polygon contour is determined by the number of inputs that need to be provided, and is equal to $2(n_p+n_u-1)$ cycles.

The value of the counter does not directly represent the value of i in the feasible match triple ((i,j),1). Similarly, the column number does not directly represent the value of j in the feasible match. The value of the counter in conjunction with the column number can be used to determine the values of i and j.

(iv) From Lemma 4, it can be seen that MEPE(1) performs its first computation at T=4L+3. The comparator network compares the n-th outputs from each of the FMPEs in the last row, and min($n_p,n_u$) such comparisons per diagonal need to be performed to determine the longest feasible match. Thus, it will take a further 2 min($n_p,n_u$)−2 cycles to perform these computations. The edge length ratios for the next known polygon contour should not interact with those of the unknown contour before the computations for the previous known polygon contour are completed. Thus, MEPE(1) should not receive inputs for the next known polygon contour until T=2 min($n_p,n_u$)+4L+2, and MEPE(2L+1) should not receive the next set of inputs until T=2 min($n_p,n_u$)+4L+3.

Even though for a single known polygon contour the computations are completed in $2(n_u+n_p-1)$ cycles, when multiple known polygon contours are compared with an unknown contour in a pipelined fashion, the architecture imposes certain constraints as explained in (iv). For the general case, this implies that between the last edge length ratio for a particular known polygon contour and the first edge length ratio for the next known polygon contour, there must be a delay of $4L-2n_p+3$ cycles. Similarly, a delay of $4L-2n_u+3$ cycles between the last edge length ratio of the unknown contour for known polygon contour n and the unknown contour's first edge length ratio for known polygon contour n+1 are required.

If there are q known polygon contours, then inputs to the left end of the array are provided in the following order: $\{(\lambda^{p1}_{i,2},\lambda^{p1}_{i,3},\ldots,\lambda^{p1}_{i,n_{p1}},\lambda^{p1}_{i,1},\ldots,\lambda^{p1}_{i,min(n_u,n_{p1})},P_1\infty'\delta),\ldots(\lambda^{pq}_{i,2},\lambda^{pq}_{i,3},\ldots,\lambda^{pq}_{i,n_{pq}},\lambda^{pq}_{i,1},\ldots,\lambda^{pq}_{i,min(n_u,n_{pq})},P_q\infty'\delta)\}$, while the inputs to the right end follow the pattern: $\{(\lambda^u_{i,2},\lambda^u_{i,3},\ldots,\lambda^u_{i,n_u},\lambda^u_{i,1},\ldots,\lambda^u_{i,min(n_u,n_{p1})},U_1-\infty'\delta),\ldots,(\lambda^u_{i,2},\lambda^u_{i,3},\ldots,\lambda^u_{i,n_u},\lambda^u_{i,1},\ldots,\lambda^u_{i,min(n_u,n_{pq})},U_q-\infty'\delta)\}$. The $\infty$ represents the largest value representable by the $\lambda$ inputs. The delays required between the last edge length ratio of known polygon contour n and the first edge length ratio for known polygon contour n+1 is represented as $P_n$ and is calculated as explained earlier. The $U_n$ delays are defined in a similar fashion.

Therefore, it takes $$\sum_{i=1}^{q} (2 \min(n_u, n_{pi}) + 4L + 1)$$

cycles to process q known polygon contours.

Figure 13A:
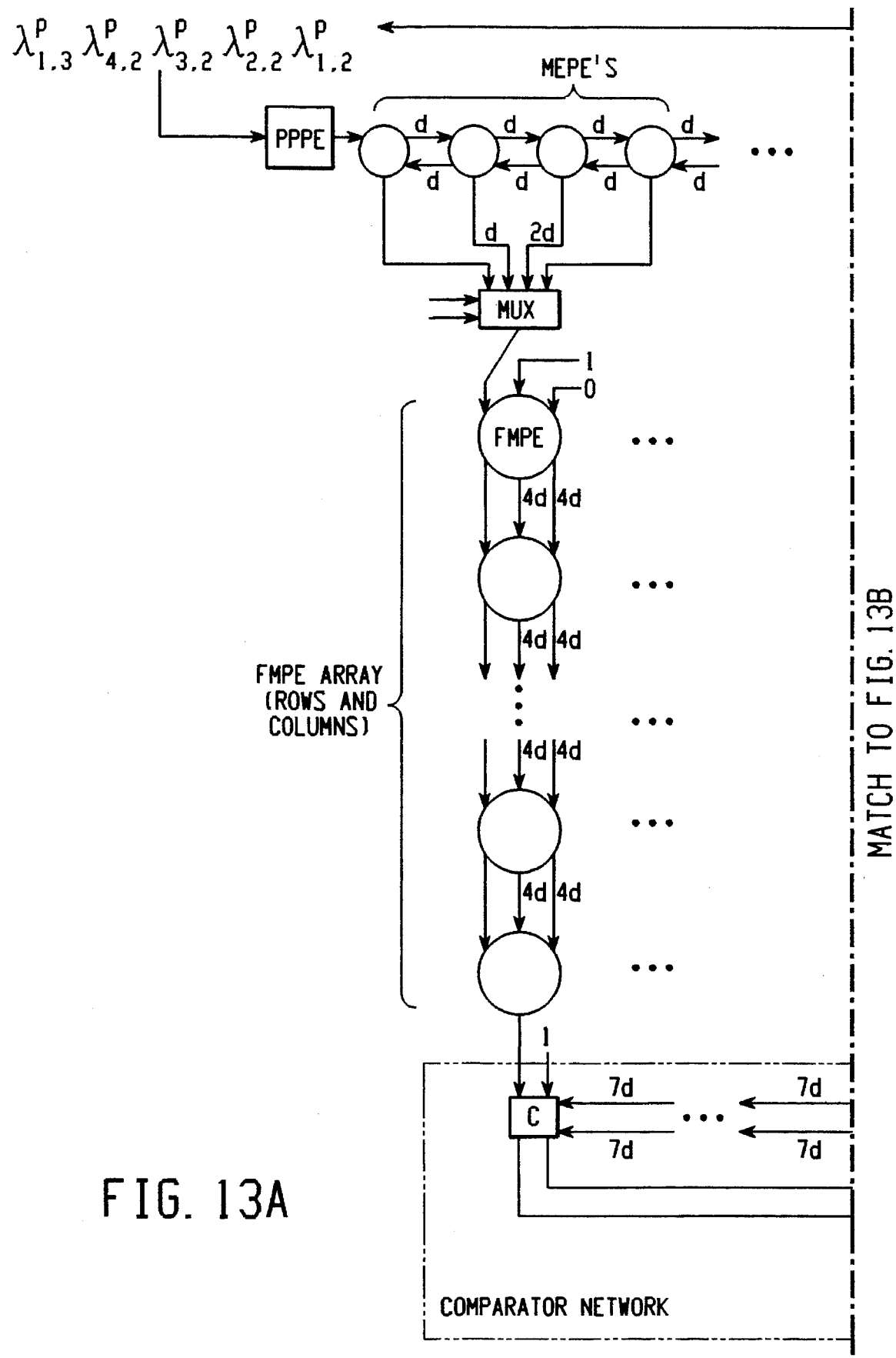
FIGS. 13A, 13B, and 13C are a schematic illustration of another VLSI architecture for implementing the technique of the present invention.
Figure 13B:
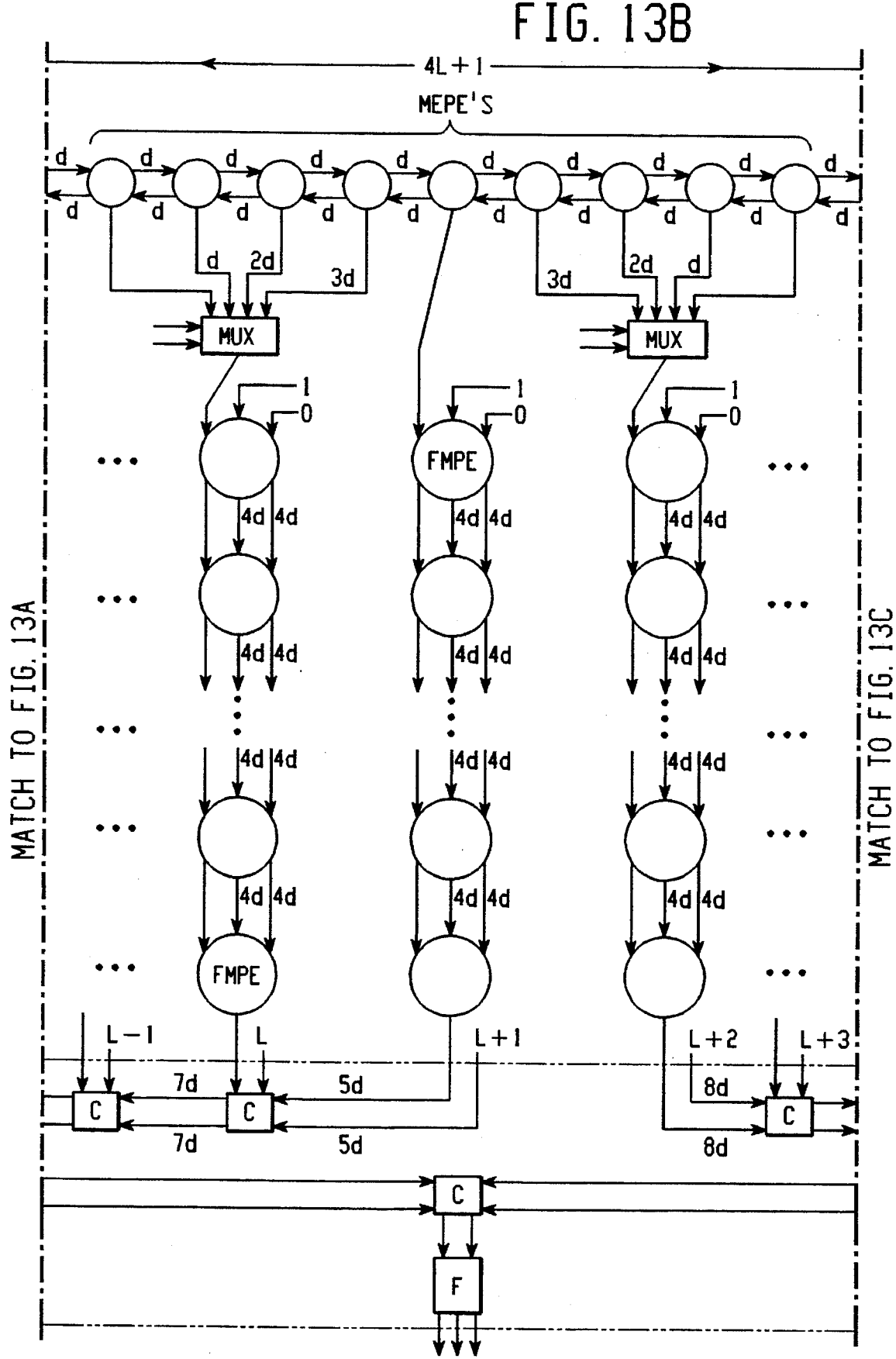
Figure 13C:
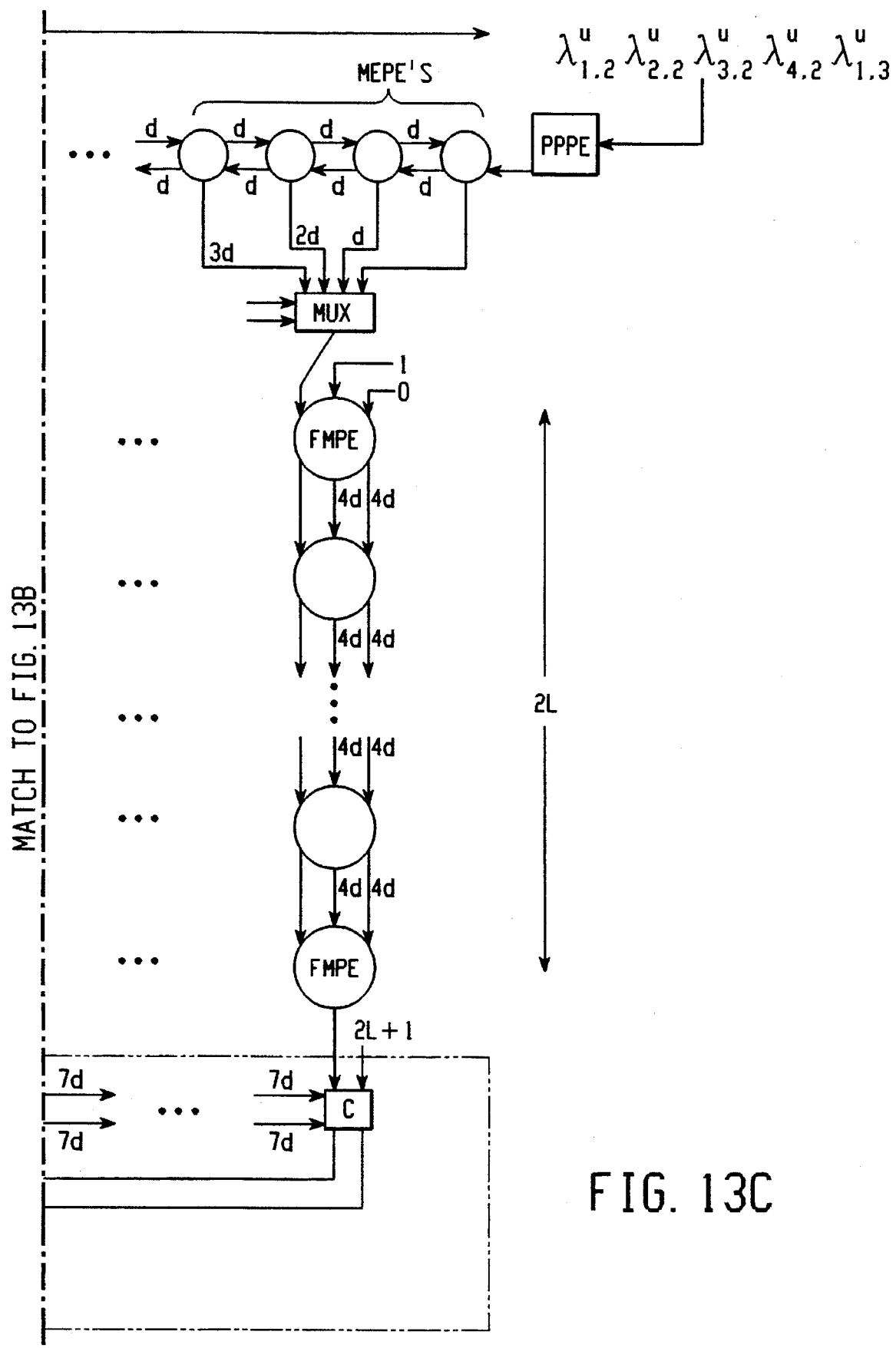

IX. VLSI Architecture 3 (FIGS. 13A, 13B, and 13C)

In this architecture (refer to FIGS. 13A, 13B, and 13C) instead of feeding all four edge length ratios (for the known polygon contours and unknown contour respectively) in parallel, the edge length ratios for the known polygon contours and unknown contours are fed in sequentially. Thus, only two inputs are supplied to the system during each clock cycle. Each PE in the first row computes elements of the D(i,j) matrix along different diagonals, and generates a new value every four cycles. It is thus possible to stagger the outputs from four consecutive PE's, and to make use of a single column of Feasible Match Computation PE's for these four MEPEs as shown in FIGS. 13A, 13B, and 13C. This results in 100% efficiency and is thus optimal. The outputs from four consecutive MEPEs are combined by using multiplexers. The components of the architecture and the hardware algorithm are described in detail next.

A. Preprocessing

Figure 14:
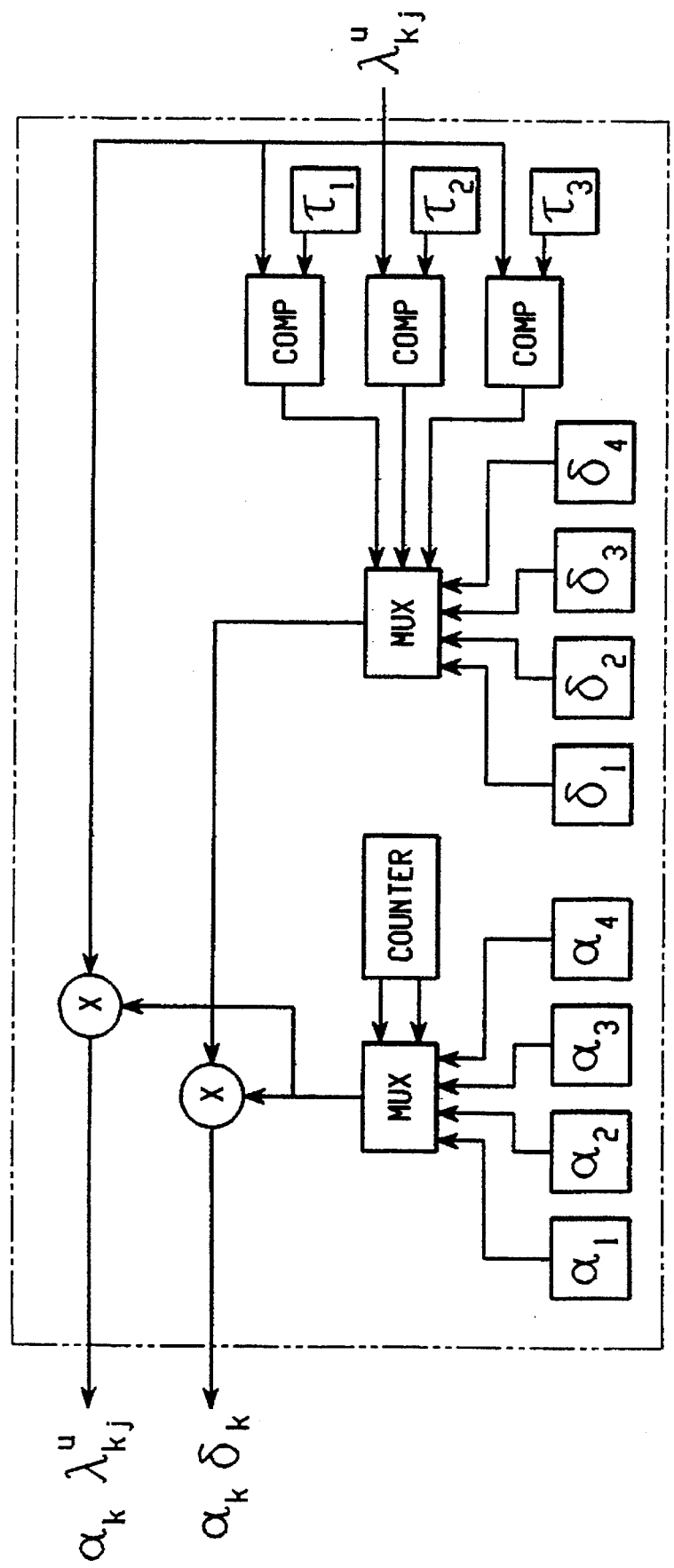
FIG. 14 is a schematic illustration of a preprocessing processing element for the VLSI architecture of FIGS. 13A, 13B, and 13C.

The block diagram of the Preprocessing PE (PPPE) for this architecture is shown in FIG. 14. It is very similar to a single module of the PPPE used by the other designs. Since the PPPE gets the four edge length ratios of an edge sequentially, it has to multiply successive edge length ratios and threshold $\delta_i$ values by successive values of $\alpha_i$. Therefore, in addition to the normal logic, it has a mod 4 counter to keep track of the index i, whose output selects the corresponding $\alpha_i$ through a multiplexer.

B. Matrix Element Computation

FIG. 15 shows the block diagram for the MEPE of this architecture. It consists of an absolute difference module that operates on the edge length ratios of a known polygon contour and unknown contour that are currently available as inputs, an adder that sums the threshold $\delta$ values of the known polygon contour and unknown contour, and an accumulator. The output of the adder is subtracted from that of the absolute difference module, and this result is accumulated over four clock cycles. A tag bit is used to ensure proper sequencing. It is set to a O whenever the first edge length ratio $\lambda_{1,j}$ for an edge is available as input and 1 otherwise. Thus, after every four clock cycles, a new element of the D(i,j) matrix is output by the MEPE. The position of an MEPE determines the diagonal for which it performs computations. Each MEPE performs computations for one diagonal of the D matrix. Since a new element is computed only once in every four clock cycles, the outputs from four consecutive MEPEs can be staggered in such a fashion that the four MEPEs together generate a new element every clock cycle. This is accomplished through delays and by using a multiplexer to select the appropriate MEPE's output.

C. Feasible Match Computation

The FMPEs used by this architecture are identical to those used by the other architectures. However, computations for four consecutive matrix diagonals are now interleaved within each FMPE. Thus, the number of FMPEs required by this architecture is reduced by half with respect to the previous one.

D. Hardware Architecture Processing Technique

Lemma 5 states when a particular edge length ratio of a known polygon contour reaches an MEPE. Lemma 6 does the same for edge length ratios of the unknown contour. Theorem 3 then establishes what computations each MEPE performs. The Theorem and Lemmas together state the hardware processing technique in a formal manner.

Consider an implementation with 4L+1 MEPEs and an array of 2L×(L+1) FMPEs.

Lemma 5 $\lambda'^p_{i,j}$ arrives at MEPE(k) at T=4j+2k+i−9.

Proof. $\lambda^p_{i,j}$ is input to the system at T=4(j−2)+i. $\lambda'^p_{i,j}$ is output by the PPPE after one time unit, i.e. at T=4j+i−7. It reaches MEPE(k) after another 2(k−1) clock cycles, i.e. at T=4j+2k+i−9. □

Lemma 6 $\lambda'^u_{i,l}$ arrives at MEPE(k) at T=2(2l+4L−k)+i−5.

Proof. $\lambda^u_{i,l}$ is input to the system at T=4(1−2) +i. $\lambda'^u_{i,l}$ is output by the PPPE after a cycle at T=4l+i−7. It then reaches MEPE(k) after another 2(4L+1−k) time units, i.e. at T=2(2l+4L−k)+i−5. □

Theorem 3 MEPE(k) computes D(j,i) where l=j+k−2L−1.

Proof. Consider MEPE(k). From Lemma 5, $\lambda'^p_{i,j}$ will reach MEPE(k) at $$T=4j+2k+i-9 \tag{5}$$

From Lemma 6, $\lambda'^u_{i,l}$ will reach MEPE(k) at $$T=2(2l+4i-k)+i-5 \tag{6}$$

Equating (5) and (6) we get l=j+k−2L−1. □

Corollary 2 MEPE(k) outputs D(j,l) at T=4j+2k−4.

Proof. From Lemma 5, we know that $\lambda'^p_{4,j}$ arrives at MEPE(k) at T=4j+2k−5. D(j,l) is output after another time unit, i.e. at T=4j+2k−4(the value for l is provided by Theorem 3). □

It can be seen from Theorem 3 that each MEPE computes elements along a single diagonal of the D matrix. For example, the central MEPE(k=2L+1) performs computations for the diagonal starting at D(1,1), while the one to its left (k=2L) does so for the diagonal starting at D(2,1), and the one to its right for the diagonal starting at D(1,2).

Lemma 7 The multiplexers select new matrix elements during each clock cycle.

Proof. Clearly Mux(m), 1≤m≤L/2 receives inputs from MEPE(k), k=4m−i, i=0, . . . ,3. These MEPEs produce outputs for D(j−4m+2L+1,j), D(j−4m+2L+2,j), D(j−4m+2L+3,j), D(j−4m+2L+4) at T=4j+8L−8m, 4j+8L−8m+2, 4j+8L−8m+4, 4j+8L−8m+6 respectively. From FIGS. 13A, 13B, and 13 C, we see that these outputs reach the Mux after delays of 3, 2, 1 and 0 time units respectively, i.e. at T=4j+8L−8m+3, 4j+8L−8m+4, 4j+8L−8m+5, 4j+8L−8m+6 respectively. Thus, Mux(m) receives a new value of D(j,l) during each clock cycle. A similar analysis can be done for Mux(m), L/2<m≤L. □

The delays introduced on the connections between the FMPEs ensure that the appropriate matrix elements interact as they move down each column. Since each FMPE performs feasible match computations for four consecutive diagonals, and since new values for each diagonal are available only once in four clock cycles, a relative delay of 4 time units is maintained between the fast and slow channels as shown in FIG. 15.

E. Implementation Issues and Performance

An implementation of this architecture with 4L+1 MEPEs and a (L+1)×2L array of FMPEs can perform computations for prototypes and unknown inputs with up to 2L edges. The hardware simplification possible with this architecture comes at the expense of additional control for the multiplexers. The throughput is also half that of the second architecture, and a fourth of the first one.

The hardware implementation can be simplified as in the previous cases. Only two inputs are required for the edge length ratios, one for a known polygon contour and another for the unknown contour. However, control logic is required for the multiplexers in this architecture. The performance analysis for this architecture can be performed in a fashion similar to that for the previous two.

X. Additional Comments

A technique and VLSI implementation of the technique has been proposed above for recognizing polygons in the presence of partial occlusions. That is believed to be an improvement (from a hardware implementation perspective) over the technique proposed by Bunke and Glauser. Three different VLSI architectures have been disclosed for recognizing partial polygons. These architectures differ in the specific way in which they perform the various processing steps required by the technique. All of them operate at an efficiency of 100%, and achieve high throughputs by utilizing a large degree of parallelism and pipelining. They are regular and simple, and require minimal or absolutely no control logic. The architectures are optimum in that they utilize each input value to the maximum possible extent. They are conceptually simple and suitable for VLSI implementation.

We claim:

1. A method for use in identifying an unknown two dimensional contour as corresponding to one or more of a plurality of known two dimensional polygon contours, comprising the steps of:

(a) providing a plurality of identifiers for each known two dimensional polygon contour, the identifiers for each known two dimensional polygon contour comprising a plurality of edge length ratios and corresponding threshold values for each of the edges of each known two dimensional polygon contour, (b) providing a plurality of identifiers for the unknown two dimensional contour, comprising a plurality of edge length ratios and corresponding threshold values for each of the edges of the unknown contour, (c) providing a systolic processing system comprising a plurality of matrix element processing elements (MEPEs), and an array of feasible match processing elements (FMPEs) interconnected with selected MEPEs and with each other in a predetermined configuration, (d) inputing to the plurality of MEPEs, in a predetermined sequence, pairs of edge length ratios and corresponding threshold values for consecutive edges of the unknown contour and for each of the known polygon contours, each MEPE being configured to (i) receive the edge length ratios and corresponding threshold values for a pair of edges of the unknown contour and a known polygon contour, (ii) determine a dissimilarity value for the pair of edges, and (iii) direct the dissimilarity value to a selected FMPE of the array, the dissimilarity value for a pair of edges being determined as a function of the absolute differences between respective edge length ratios and corresponding threshold values for the pair of edges, and the array of FMPEs being in a configuration which determines feasible matches between pairs of consecutive edges of the unknown contour and the known prototype contours and delivers outputs related thereto, and (e) comparing such outputs and delivering a final output which is indicative of the longest number of consecutive edges, above a predetermined minimum, for which feasible matches have occurred between the unknown contour and a known polygon contour.

2. The method as set forth in claim 1, wherein each FMPE in the array receives as inputs (i) two dissimilarity values, at least one of which comes from a predetermined MEPE, which are used to determine whether a predetermined match criteria has been satisfied, and (ii) a length value which relates to the number of consecutive edges of the unknown contour and a known polygon contour for which the predetermined feasible match criteria has been satisfied, and wherein each FMPE in the array delivers output which reflects whether the dissimilarity values input to the FMPE satisfies the predetermined feasible match criteria and a length value which relates to the number of consecutive edges of the unknown contour and a known polygon contour for which the predetermined feasible match criteria has been satisfied.

3. A The method as set forth in claim 2, wherein the predetermined feasibility match criteria relates to whether feasible matches of consecutive edges of the unknown contour with one of the known polygon contours are continuing, and the array of FMPEs delivers output reflecting the number of consecutive edges of the unknown contour and known polygon contours for which the predetermined feasible match criteria has been satisfied.

4. The method as set forth in claim 3, wherein the inputing to the plurality of MEPEs of pairs of edge length ratios and corresponding threshold values comprises pre-storing the edge length ratios and corresponding threshold values for the unknown contour in the plurality of MEPEs, and serially inputing to the plurality of MEPEs during each clock cycle edge length ratios and corresponding threshold values for consecutive edges of each known polygon contour, the MEPEs being interconnected with each other in a manner which sequentially transmits the edge length ratios and corresponding threshold values in one direction from one MEPE to another during each clock cycle.

5. The method as set forth in claim 4, wherein the edge length ratios and corresponding threshold values for the known polygon contours are input as parallel inputs to the plurality of MEPEs during each clock cycle.

6. The method as set forth in claim 3, wherein the inputing to the plurality of MEPEs pairs of edge length ratios and corresponding threshold values comprises sequentially inputing to each of the MEPEs the edge length ratios and corresponding threshold values for the unknown contour and the known polygon contours, the MEPEs being interconnected to each other in a manner which sequentially transmits edge length ratios and corresponding threshold values for the unknown contour and the known polygon contours in opposite directions from one MEPE to another.

7. The method as defined in claim 6, wherein the plurality of MEPEs are disposed in a row, and wherein the edge length ratios and corresponding threshold values for the unknown contour and the known polygon contours are input to the row of MEPEs from opposite ends thereof.

8. The method as defined in claim 7, wherein the edge length ratios and corresponding threshold values for the unknown contour and the known polygon contours are input as parallel inputs to the row of MEPEs during alternate clock cycles.

9. The method as defined in claim 7 wherein the edge length ratios and corresponding threshold values for the unknown contour and the known polygon contours are serially input to the row or MEPEs during each clock cycle.

10. VLSI architecture for use in a system for identifying an unknown two dimensional contour as corresponding to one or more of a plurality of known two dimensional polygon contours, wherein the system has a plurality of identifiers for each known two dimensional polygon contour, the identifiers for each known two dimensional polygon contour comprising a plurality of edge length ratios and corresponding threshold values for each of the edges of each known two dimensional polygon contour, and wherein the system has a plurality of identifiers for the unknown two dimensional contour comprising a plurality of edge length ratios and corresponding threshold values for each of the edges of the unknown contour, said VLSI architecture comprising:

(a) a systolic processing system comprising a plurality of matrix element processing elements (MEPEs), and an array of feasible match processing elements (FMPEs) interconnected with selected MEPEs and with each other in a predetermined configuration, (b) the plurality of MEPEs being configured to receive, in a predetermined sequence, inputs comprising pairs of edge length ratios and corresponding threshold values for consecutive edges of the unknown contour and for each of the known polygon contours, each MEPE being configured to
  (i) receive the edge length ratios and corresponding threshold values for a pair of edges of the unknown contour and a known polygon contour,
  (ii) determine a dissimilarity value for the pair of edges, and
  (iii) direct the dissimilarity value to a selected FMPE of the array;

(c) the dissimilarity value for a pair of edges being determined as a function of the absolute differences between respective edge length ratios and corresponding threshold values for the pair of edges, and the array of FMPEs being in a configuration which determines feasible matches between pairs of consecutive edges of the unknown contour and the known polygon contours and delivers outputs related thereto, and (d) a comparator device for comparing such outputs and delivering a final output which is indicative of the longest number of consecutive edges, above a predetermined minimum, for which feasible matches have occurred between the unknown contour and a known polygon contour.

11. The VLSI architecture as set forth in claim 10, wherein each FMPE in the array receives as inputs (i) two dissimilarity values, at least one of which comes from a predetermined MEPE, which are used to determine whether a predetermined match criteria has been satisfied, and (ii) a length value which relates to the number of consecutive edges of the unknown contour and a known polygon contour for which the predetermined feasible match criteria has been satisfied, and wherein each FMPE in the array is configured to deliver output which reflects whether the dissimilarity values input to the FMPE satisfies the predetermined feasible match criteria and a length value which relates to the number of consecutive edges of the unknown contour and a known polygon contour for which the predetermined feasible match criteria has been satisfied.

12. The VLSI architecture as set forth in claim 11, wherein the predetermined feasibility match criteria relates to whether feasible matches of consecutive edges of the unknown contour with one of the known polygon contours are continuing, and the array of FMPEs delivers output reflecting the number of consecutive edges of the unknown contour and known polygon contours for which the predetermined feasible match criteria has been satisfied.

13. The VLSI architecture as set forth in claim 12, wherein the plurality of MEPEs has pre-stored edge length ratios and corresponding threshold values for the unknown contour, and the edge length ratios and corresponding threshold values for consecutive edges of each known polygon contour are sequentially input to the plurality of MEPEs during each clock cycle, the MEPEs being interconnected with each other in a manner which sequentially transmits the edge length ratios and corresponding threshold values in one direction from one MEPE to another during each clock cycle.

14. The VLSI architecture as defined in claim 13, wherein MEPEs are configured to receive the edge length ratios and corresponding threshold values for the known polygon contours as parallel inputs during each clock cycle.

15. The VLSI architecture as set forth in claim 12, wherein the plurality of MEPEs are interconnected with each other in a manner which sequentially transmits edge length ratios and corresponding threshold values for the unknown contour and the known polygon contours in opposite directions from one MEPE to another, and the MEPEs configured to receive sequential inputs of the edge length ratios and corresponding threshold values for the unknown contour and the known polygon contours.

16. The VLSI architecture as defined in claim 15, wherein the plurality of MEPEs are disposed in a row, and wherein the MEPEs at opposite ends of the row are configured to receive edge length ratios and corresponding threshold values for the unknown contour and the known polygon contours.

17. The VLSI architecture as defined in claim 16, wherein the MEPEs at opposite ends of the row are configured to receive the edge length ratios for the unknown contour and the known polygon contours as parallel inputs during alternate clock cycles.

18. The VLSI architecture as defined in claim 16, wherein the MEPEs at opposite ends of the row are configured to receive the edge length ratios and corresponding threshold values for the unknown contour and the known polygon contours as serial inputs during each clock cycle.

* * * * *

UNITED STATES PATENT AND TRADEMARK OFFICE
CERTIFICATE OF CORRECTION

PATENT NO. : 5,535,292
DATED : July 9, 1996
INVENTOR(S) : Nagarajan Ranganathan; Raghu Sastry It is certified that error appears in the above-indentified patent and that said Letters Patent is hereby corrected as shown below:

Column 24, claim 3, line 7, please delete "A".

Signed and Sealed this

Seventeenth Day of December, 1996

Attest:

BRUCE LEHMAN

*Attesting Officer*    *Commissioner of Patents and Trademarks*